(12) United States Patent  (10) Patent No.: US 7,539,513 B2
Cathey, Jr. et al.  (45) Date of Patent: May 26, 2009

(54) PORTABLE PHONE WITH ERGONOMIC IMAGE PROJECTION SYSTEM

(75) Inventors: David A. Cathey, Jr., Boise, ID (US); Steven Howell, Boise, ID (US); James Cathey, Eagle, ID (US)

(73) Assignee: National Telephone Products, Inc., Boise, ID (US)

( * ) Notice: Subject to any disclaimer, the term of this patent is extended or adjusted under 35 U.S.C. 154(b) by 772 days.

(21) Appl. No.: 11/049,458

(22) Filed: Feb. 2, 2005

(65) Prior Publication Data

US 2006/0172767 A1 Aug. 3, 2006

(51) Int. Cl.
 *H04Q 7/32* (2006.01)
(52) U.S. Cl. ............... 455/556.1; 455/550.1; 455/556.2; 455/557; 455/575.1; 455/90.3; 379/433.01; 345/7; 345/205
(58) Field of Classification Search ................. 455/566, 455/550.1, 557, 556.2, 90.2, 90.1, 575.1–575.9, 455/422.1, 500, 517, 90.3, 418–420; 379/433.01; 345/7, 205
See application file for complete search history.

(56) References Cited

U.S. PATENT DOCUMENTS

| | | | |
|---|---|---|---|
| 5,970,418 A | 10/1999 | Budd et al. | |
| 5,987,330 A | 11/1999 | Otsuji et al. | |
| 6,044,281 A | 3/2000 | Shirai | |

(Continued)

FOREIGN PATENT DOCUMENTS

JP 02002102251 A 4/2002

(Continued)

OTHER PUBLICATIONS

Telephone and Portable Phone Visual Caller ID, IBM Technical Disclosure Bulletin, cited in IPCOM #000016267D, Jun. 21, 2003, pp. 1-2.

(Continued)

*Primary Examiner*—Keith T Ferguson
(74) *Attorney, Agent, or Firm*—Stephen A. Gratton

(57) ABSTRACT

A portable phone includes a handset and a data projection system configured to form a visual image of data, such as caller waiting ID data, on a viewing surface viewable by a user during a two way conversation. The handset also includes a speaker, a microphone, conventional phone circuitry and a keyboard. The data projection system is configured to receive signals from the phone circuitry, to generate a pattern representative of the data, to process the pattern into a mirror image of the visual image, and to project the mirror image from a bottom end surface of the handset. The projection system includes an electro optic system for generating the pattern, and an optics system for projecting the mirror image onto the viewing surface.

A method for projecting data in a portable phone includes the steps of: providing the handset with the data projection system, conducting a two way conversation with the handset held against the head of the user, and forming the visual image on the viewing surface during the two way conversation with the handset held against the head. The method can also include the steps of manipulating the handset and a body part to locate and focus the visual image, sensing an orientation of the handset during the two way conversation, and orienting the visual image as a function of the sensing step.

134 Claims, 17 Drawing Sheets

U.S. PATENT DOCUMENTS

| | | | |
|---|---|---|---|
| 6,125,277 | A | 9/2000 | Tanaka |
| 6,211,903 | B1 | 4/2001 | Bullister |
| 6,360,104 | B1 * | 3/2002 | Budd et al. ................. 455/566 |
| 6,371,616 | B1 | 4/2002 | Doany et al. |
| 6,418,209 | B1 | 7/2002 | Fujikura et al. |
| 6,489,934 | B1 | 12/2002 | Klausner |
| 6,614,422 | B1 | 9/2003 | Rafii et al. |
| 6,623,127 | B2 | 9/2003 | Bhat |
| 6,655,597 | B1 | 12/2003 | Swartz et al. |
| 6,658,273 | B1 | 12/2003 | Sharp |
| 6,714,630 | B1 | 3/2004 | Baum |
| 6,724,892 | B1 | 4/2004 | Mason et al. |
| 6,751,487 | B1 | 6/2004 | Rydbeck et al. |
| 7,009,254 | B2 | 3/2006 | Nagasawa et al. |
| 7,184,796 | B2 * | 2/2007 | Karidis et al. ............... 455/566 |
| 2002/0063855 | A1 | 5/2002 | Williams |
| 2003/0107883 | A1 | 6/2003 | Pienimaa et al. |
| 2003/0184575 | A1 | 10/2003 | Reho et al. |
| 2003/0218704 | A1 | 11/2003 | Lee et al. |
| 2004/0125929 | A1 | 7/2004 | Pope |

FOREIGN PATENT DOCUMENTS

| | | |
|---|---|---|
| KR | 2000-0030885 | 6/2000 |
| KR | 10-2001-0038333 | 5/2001 |
| KR | 2002-0042400 | 6/2002 |
| KR | 10-0466259 | 1/2005 |
| WO | PCT/US03/15214 | 11/2003 |
| WO | PCT/AU2003/001158 | 3/2004 |
| WO | WO2004/023208 A1 | 3/2004 |

OTHER PUBLICATIONS

Edmund Industrial Optics, Tech Spec Achromatic Lenses, specification sheet, acromatic lenses, 2004 (month unavailable), p. 1.

Cree Lighting, XLamp 790, specification sheets, 2004 (month unavailable), pp. 1-14.

Novatek, NT7605, Single-chip 20C X2L Dot-Matrix LCD Controller/Driver, specification sheets, 2004 (month unavailable), pp. 1-33.

Pacific Display Devices, for all of your LCD needs, brochure and custom COG LCD specification sheets, Jan. 19, 2005, pp. 1-7.

Iguana Labs, The 7 Segment Display, LED specification sheets, Jan. 19, 2005, pp. 1-3.

Excerpt from the science fiction movie Silver Hawk. DVD from Flashstar Home Video LTDA, Copyright 2003 Han Entertainment Ltd., located approximately at C7.

Instruction manual for WT-5431 433MHz Radio Controlled Projection Alarm, La Crosse Technology, La Crescent, MN, pp. 1-23, date unavailable.

Symbol Products, "Preliminary Concept: Laser Projection Display (LPD)", advertising material, Jun. 25, 2004, pp. 1-3.

Hammacher Schlemmer, "Most Visible Caller ID Globe", advertising material, 2004, pp. 1-2.

Slashphone. "Wave Messaging with AirBeam", advertising material, Jun. 27, 2005, pp. 1-4.

"PowerPoint Projected From Your Cell Phone?", Personal tech pipeline, newsletter, Dec. 8, 2004, pp. 1-3.

* cited by examiner

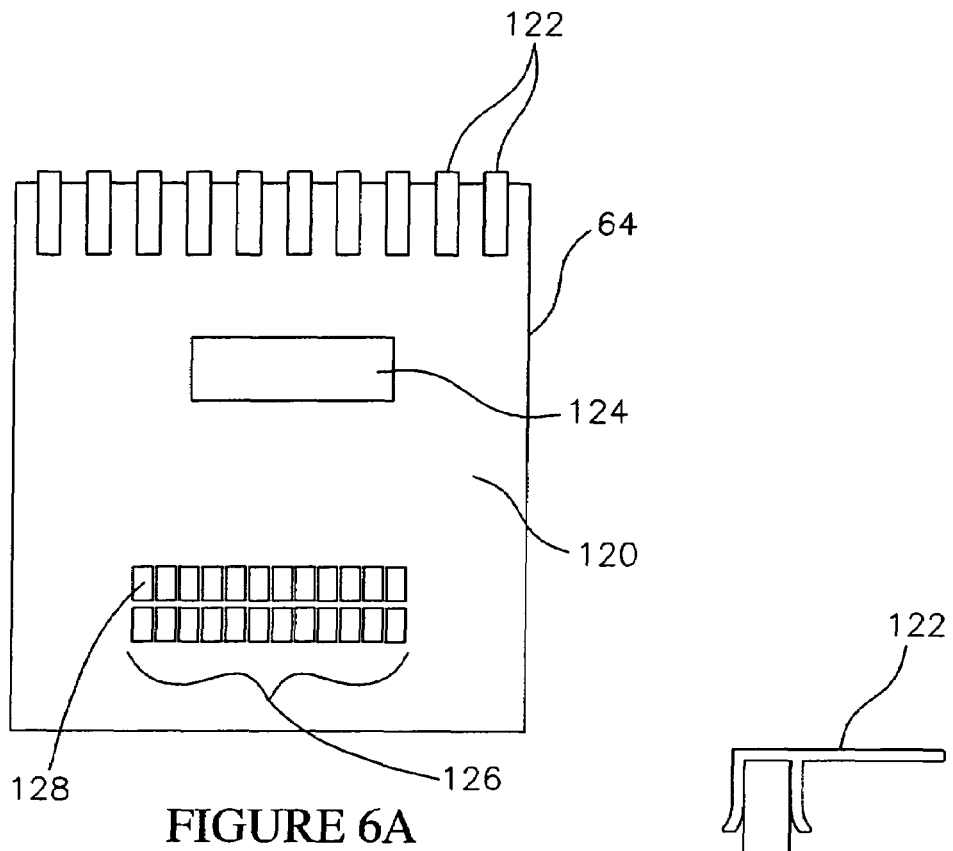
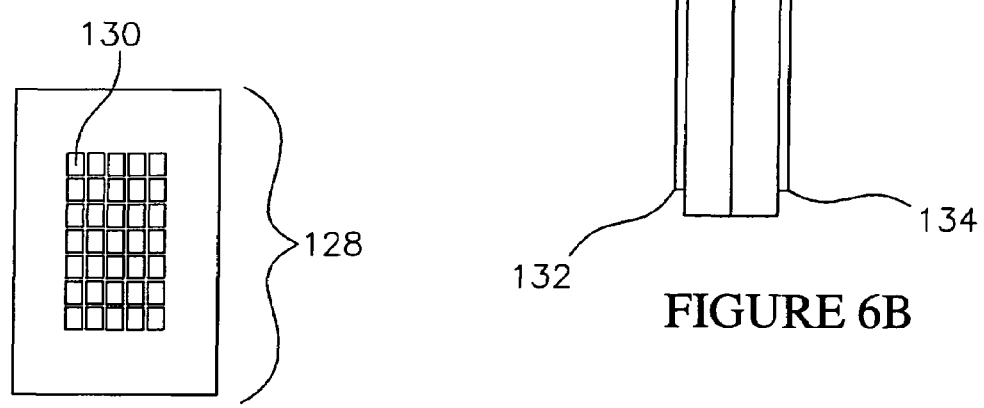
FIGURE 6A
FIGURE 6B
FIGURE 6C

PORTABLE PHONE WITH ERGONOMIC IMAGE PROJECTION SYSTEM

FIELD OF THE INVENTION

This invention relates generally to portable communications devices, and more particularly to portable phones, such as cordless phones and cellular phones.

BACKGROUND OF THE INVENTION

Portable phones are widely used for communicating and transmitting information between users. Portable phones include cordless phones which receive signals from a base station controlled by a user over a relatively short range, typically on a frequency of 900 MHz, 2.4 Ghz or 5.8 GHz. Portable phones also include cellular phones for a greater range, which typically receive signals from a telecommunications network using various platforms, such as ANALOG, CDMA, TDMA and GSM. Portable phones also include satellite phones, where the portable phone is in direct transmission to and from a communications satellite orbiting the earth, such as the "GLOBAL STAR" system and the "IRIDIUM" system.

Some portable phones employ a handset configured for holding in one hand and placement against the user's head. A conventional handset for a portable phone includes a speaker configured for placement proximate to the ear, and a microphone configured for placement proximate to the mouth.

The handset can also include a face having a key pad, and a direct view display configured to display a visual image of data in an alphanumeric or video format. Some types of data that can be visually displayed on the direct view display are "caller waiting ID" data. Moreover, the data can be displayed, even when the user is conducting a two way conversation with the handset held against the head. For example, during a two way conversation, the data can include the originating phone number of an incoming call.

One limitation of a conventional handset is that the direct view display cannot be seen by the user with the handset held against the head. During a two way conversation, in order to view the data, the user must hold the handset away from the ear, and place the direct view display at least several inches in front of the eyes. This requires interrupting a two way conversation to read data from a third party during the conversation, such as caller waiting ID data. Although this problem can be avoided by speaker phones, this approach has limitations, in that confidentiality and sound fidelity are reduced, and the transmission of environmental noises is increased.

The present invention is directed to a portable phone having a data projection system configured to generate and project a visual image of data onto a viewing surface which is in close proximity to the user, and easily viewable by the user. This permits the visual image to be ergonomically viewed by the user even with the handset held against the head. Two way phone conversations can thus be carried out without interruption, and without the limitations of speaker phones.

SUMMARY OF THE INVENTION

In accordance with the present invention a portable phone, and a method for displaying data in a portable phone, are provided.

The portable phone includes a handset configured for holding in a user's hand, and placement against the head during a two way conversation. The handset includes a speaker, a microphone, a keypad, and a direct view visual display on a front surface thereof. In addition, the handset includes a battery, and a pair of charging contacts for the battery on a bottom end surface thereof. Further, the handset includes conventional phone circuitry configured to generate and display a first visual image of data on the direct view visual display.

The handset also includes an image projection system configured to form a second visual image on a viewing surface, such as a body part of the user, which is easily viewable during the phone conversation with the handset held against the head. In addition, the image projection system can be operated by manipulation of the handset, and by selection and manipulation of the viewing surface, such that the second visual image can be focused, enlarged, compressed, moved or moved to another viewing surface.

The image projection system includes an electro optic system configured to generate a pattern corresponding to the second visual image. The image projection system also includes an optics system configured to process the pattern into a mirror image and to project the mirror image onto the viewing surface, which is then reflected to the user to form the second visual image. The image projection system is an integral fixed element of the handset, which eliminates the need for additional mechanical elements, and allows the second visual image to be easily located using subtle and intuitive user manipulation of the hands or other body parts. In this regard, the image projection system is optically configured to project along a vector that is controlled by manipulation of the handset about the user's head, such that the second visual image can be projected into the user's field of view with the speaker in proximity to the ear, and the microphone in proximity to the mouth. Stated differently, the handset, and the viewing surface as well, can be manipulated to provide a focused and readable second visual image in close proximity to the user. However, the handset can also be manipulated to provide privacy, or an unreadable second visual image if required, or to make the second visual image viewable by persons other than the user.

In a first embodiment, the electro optic system includes a light source in light communication with a first set of optics and a light valve, such as a liquid crystal display (LCD), configured to generate the pattern. In a second embodiment the electro optic system includes an emissive display, such as an addressable patterned LED display, an electroluminescent display, a cathode ray tube, or a field emission display, configured to generate the pattern. The optics system includes a second set of optics, which can include a single optical element (e.g., positive convex lens, positive Fresnel lens), or multiple optical elements configured to process the pattern from the electro optic system into the mirror image of the second image and to project the mirror image onto the viewing surface.

The image projection system can also be configured to orient the second visual image such that it can be read by the user from left to right, regardless of whether the handset is held against the left ear or the right ear. As such, the image projection system can include a sensing device configured to sense an orientation of the handset, and to orient the second visual image as a function of the orientation of the handset. For example, with the handset held in the user's left hand against the left ear (i.e., left hand orientation), the second visual image can be oriented for left to right reading on the user's right hand, wrist or forearm. Similarly, with the handset held in the user's right hand against the right ear (i.e., right hand orientation), the second visual image can be oriented for left to right reading on the user's left hand, wrist or forearm.

The image projection system can also include a pulsing circuit configured to pulse the second visual image from a bright image to a low image, or to a no image. The pulsing circuit reduces power consumption and heat generation by the image projection system. However, because of the way the human eye perceives and processes light, the high to low pulsing sensation results in the user perceiving a higher brightness, than the actual brightness averaged over the pulses.

The method for displaying data includes the steps of: providing the handset having the image projection system, holding the handset against the head of the user, conducting a two way conversation using the handset with the handset held against the head, transmitting data to the image projection system during the two way conversation, forming a pattern representative of the data using the image projection system, processing the pattern into a mirror image of the second visual image using the image projection system, and then projecting the mirror image from the handset onto the viewing surface using the image projection system.

The method can also include the step of moving the handset about the head during the conversation to locate the second visual image on the viewing surface, or another selected viewing surface. In addition, the method can also include the steps of: providing the handset with a sensing system, sensing an orientation of the handset using the sensing system, and then projecting the second visual image onto the viewing surface with an orientation dependent on the sensed orientation of the handset. As an alternative to the sensing system, a user may manually select a left hand or a right hand orientation for the second visual image.

BRIEF DESCRIPTION OF THE DRAWINGS

FIG. 6A is front view of a light valve component of the image projection system;

FIG. 6B is a side elevation view of FIG. 6A;

FIG. 6C is an enlarged view of the light valve component illustrating a character block;

DETAILED DESCRIPTION OF THE PREFERRED EMBODIMENTS

Figure 1A:
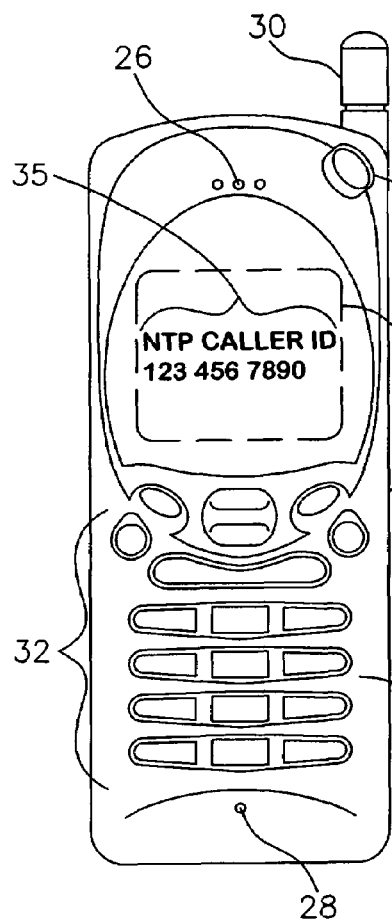
FIG. 1A is a front elevation view of a portable phone constructed in accordance with the invention with an image projection system.

Referring to FIGS. 1A-1C, FIGS. 2A-2C and FIGS. 3A-3F, a portable phone 10 constructed in accordance with the invention is illustrated. In the description to follow, drawing figures for reference numerals are sometimes indicated in parenthesis following the reference numerals. However, each reference numeral appears several times throughout the drawings, and are illustrated in more than just the parenthesized figures.

Figure 1B:
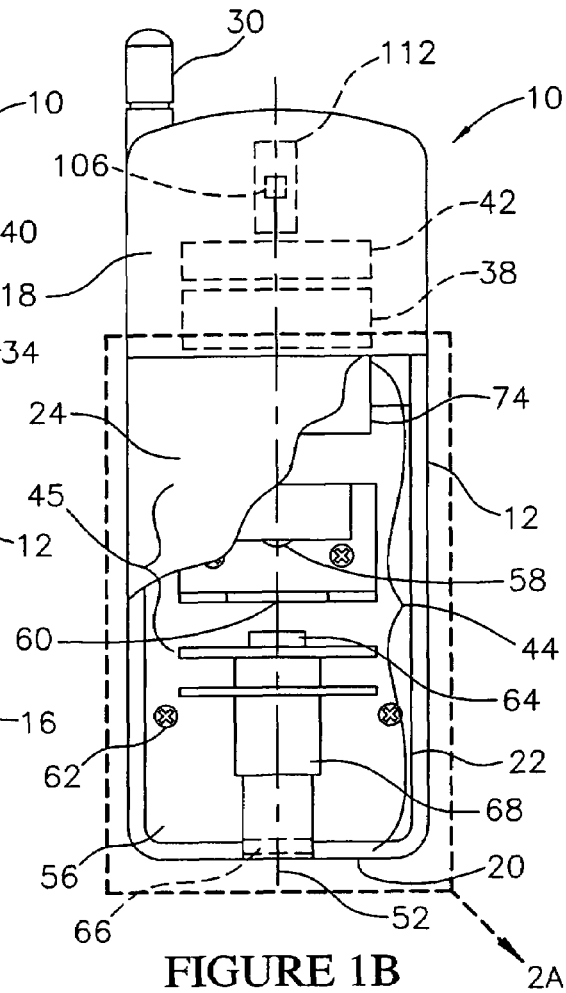
FIG. 1B is a back elevation view of the portable phone.
Figure 1C:
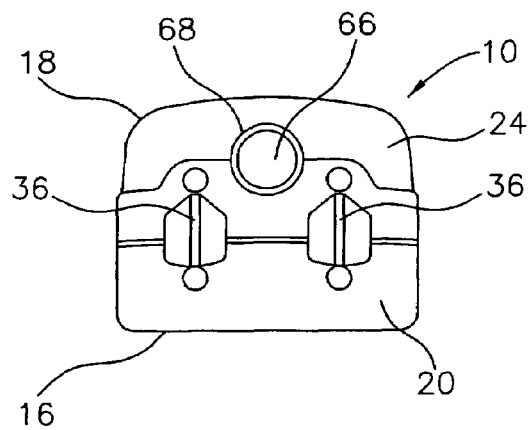
FIG. 1C is a bottom end view of the portable phone.

The portable phone 10 (FIG. 1A) can be in the form of a cordless phone or a cellular phone. In the illustrative embodiment, the portable phone 10 comprises a Uniden, model EXI-976 900 mhz cordless phone manufactured by Uniden Corporation of Tokyo, Japan, which has been modified to include an image projection system 44 (FIG. 1B). However, the present invention is not limited to a Uniden cordless phone, as the concepts herein can be adapted to the construction of any type of cordless or cellular phone. Also in the illustrative embodiment, the portable phone 10 has a unitary construction. However, the concepts of the invention are applicable to portable phones having a hinged or articulated construction.

Figures 4A, 4B:
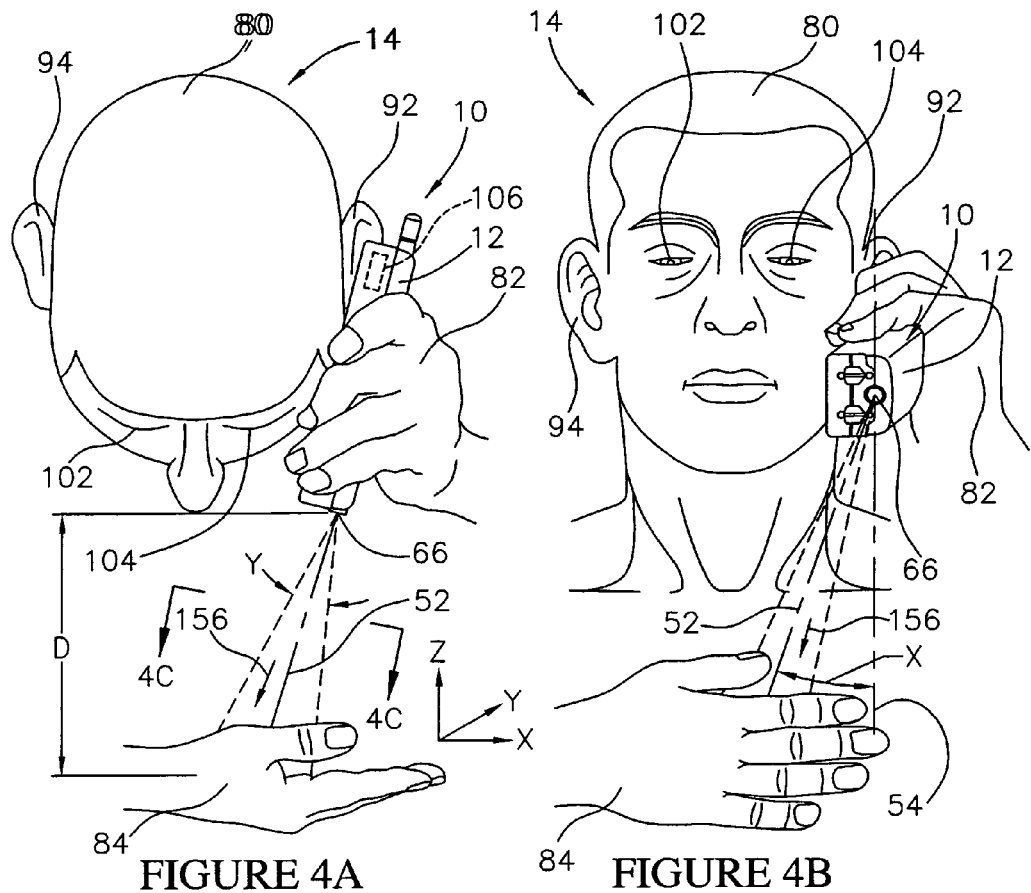
FIG. 4A is a plan view of the user engaged in a phone conversation with the portable phone held against the head with the left hand and the visual image projected onto the right hand, or alternately the right forearm.
FIG. 4B is a side elevation of FIG. 4A.

The portable phone 10 (FIG. 1A) includes a handset 12 (FIG. 1A) formed of a rigid material such as molded plastic. The handset 12 comprises a hollow support structure adapted to contain various components of the portable phone 10 (FIG. 1A), and has a size and shape suitable for holding by a user 14 (FIG. 4A). In addition, the handset 12 includes a front surface 16 (FIG. 1A), a back surface 18 (FIG. 1B), a bottom end surface 20 (FIG. 1C) and a longitudinal axis 54 (FIG. 4B). The handset 12 also includes an internal compartment 22 (FIG. 1B) having a removable cover 24 (FIG. 1B). The internal compartment 22 is proximate to the bottom end surface 20 (FIG. 1C) of the handset 12, and the cover 24 (FIG. 1B) forms a portion of the back surface 18 (FIG. 1B) of the handset 12. The handset 12 (FIG. 1C) can comprise a unitary assembly substantially as shown, or alternately can include one or more separable, hinged or articulated pieces.

The portable phone 10 also includes a speaker 26 (FIG. 1A), and a microphone 28 (FIG. 1A) having access openings on the front surface 16 (FIG. 1A) of the handset 12. Further, the portable phone 10 includes an antenna 30 (FIG. 1A) configured to send and receive signals. In addition, the portable phone 10 includes a key pad 32 (FIG. 1A) on the front surface 16 (FIG. 1A) of the handset 12 (FIG. 1A) configured for manipulation by the user 14 (FIG. 4A) for inputting data and performing various functions of the portable phone 10.

The portable phone 10 also includes phone circuitry 38 (FIG. 1B) in the handset 12 configured to generate data, such as caller waiting ID data, and a direct view display 34 (FIG. 1A) on a front surface 16 of the handset 12 configured to display a first visual image 35 (FIG. 1A) of the data. The phone circuitry 38 can comprise conventional cordless or cellular phone circuitry constructed and operated using protocols that are known in the art. By way of example, U.S. Pat. Nos. 6,418,209, 6,125,277 and 5,987,330 which are incorporated herein by reference disclose representative phone circuitry.

The portable phone 10 also includes a battery 42 (FIG. 1B) in signal communication with the phone circuitry 38 (FIG. 1B) configured to provide power for various components of the portable phone 10. A pair of external contacts 36 (FIG. 1C) on the bottom end surface 20 (FIG. 1C) of the handset 12 are configured for mating electrical engagement with a handset receptacle (not shown) for charging the battery 42 (FIG. 1B). The battery 42 (FIG. 1B) can comprise a conventional rechargeable power source, such as a NiCad battery, a nickel metal hydride battery, a lithium-ion battery, or a fuel cell, configured to provide a selected amount of power for a selected time period. In the illustrative embodiment, the battery 42 (FIG. 1B) is configured to provide from 3.4 to 4.0 volts, and 600-900 mAh.

The portable phone 10 also includes the image projection system 44 (FIG. 1B) in the internal compartment 22 (FIG. 1B), and an on/off button 40 (FIG. 1A) configured to turn the image projection system 44 (FIG. 1B) on and off. The image projection system 44 (FIG. 1B) is configured to generate and project a second visual image 46 (FIG. 3B) representative of data, such as caller waiting ID data, onto a viewing surface 48 (FIG. 3B). In the illustrative embodiment, the image projection system 44 (FIG. 1B) is configured to project the second visual image 46 (FIG. 3B) along an optical axis 52 (FIG. 3A) projecting from the bottom end surface 20 (FIG. 2B) of the handset 12. Although other arrangements can be used, the illustrative arrangement facilitates moving and focusing of the second visual image 46 (FIG. 3B) when the portable phone 10 is held against a head 80 (FIG. 4A) of the user 14 (FIG. 4A). In use, the portable phone 10 can be rotated about an ear 92 (FIG. 4A) or 94 (FIG. 5A) of the user 14 (FIG. 4A), such that the second visual image 46 (FIG. 4C) can be conveniently located and focused in front of one or both eyes 102, 104 (FIG. 4A) of the user 14 (FIG. 4A).

Figure 3A:
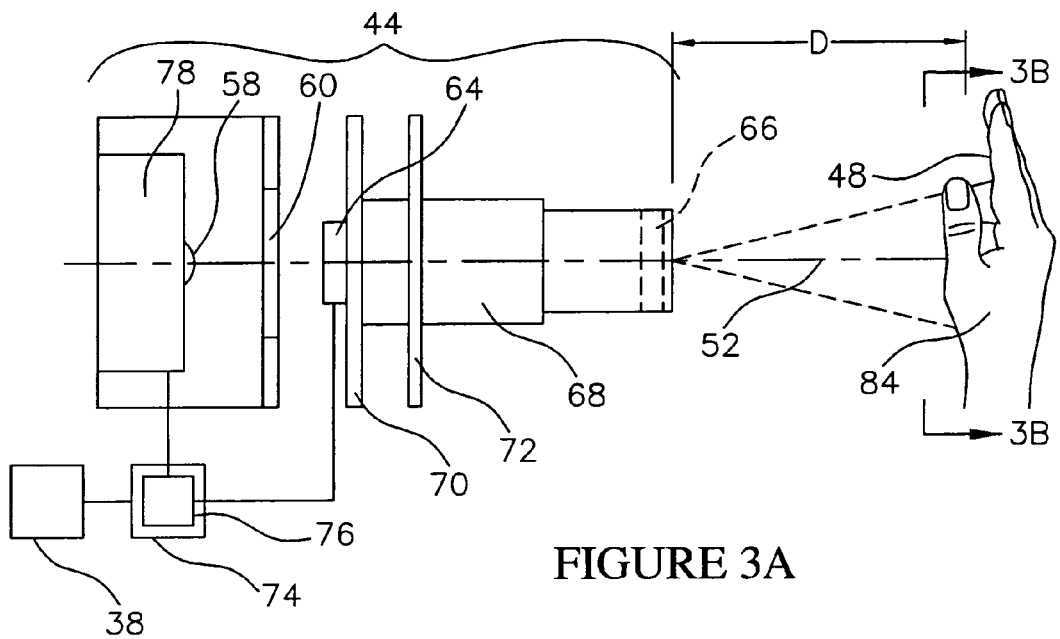
FIG. 3A is a schematic diagram of the image projection system shown projecting a visual image onto a viewing surface, which for illustrative purposes comprises a hand which has been rotated by 90° from a normal viewing position.
Figure 3B:
FIG. 3B is a view taken along line 3B-3B of FIG. 3A and rotated 90° illustrating the visual image on the viewing surface.
Figure 3C:
FIG. 3C is a view equivalent to FIG. 3B of an alternate embodiment visual image have curved alpha numeric characters.
Figure 3D:
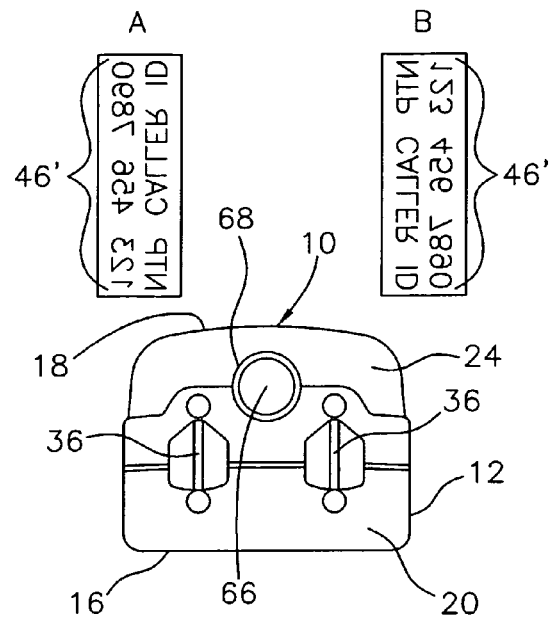
FIG. 3D is a bottom end view equivalent to FIG. 1C illustrating first and second orientations of a mirror image of the visual image after exiting the portable phone.

As shown in FIG. 3D, in the illustrative embodiment, the image projection system 44 (FIG. 1B) is configured to project a mirror image 46' of the second visual image 46 with an orientation leaving the handset 10 that is generally perpendicular, or orthogonal, to the front surface 16 and the back surface 18 of the handset 12. In this case, the image projection system 44 (FIG. 1B) also includes an orientation sensing device 106 (FIG. 3E) configured to sense the orientation of the handset 10 (i.e., left hand or right hand), and to orient the mirror image 46' of the second visual image 46 with either orientation A (FIG. 3D) or orientation B (FIG. 3D), such that the second visual image 46 reads in both cases from left to right on the viewing surface 48 (FIG. 3B).

As shown in FIG. 1B, the image projection system 44 (FIG. 1B) includes a base 56 (FIG. 1B) configured to mount various components of the system within the internal compartment 22 (FIG. 1B) of the handset 12. The base 56 (FIG. 1B) can comprise an electrically insulating material, such as plastic, having a required size and shape. In addition, a plurality of fasteners 62 (FIG. 1B), such as threaded screws, plastic weld points, snaps or pins, can be used to attach the base 56 (FIG. 1B) to the handset 12.

As also shown in FIG. 1B, the image projection system includes an electro optic system 45 configured to generate a pattern 46" (FIG. 3F) representative of the second visual image 46 (FIG. 3B) responsive to signals from the phone circuitry 38 (FIG. 1B). The electro optic system 45 (FIG. 1B) includes a light source 58 (FIG. 1B), which may be a polychromatic or monochromatic source of light having a wavelength of from 400 to 800 nanometer.

Figure 2A:
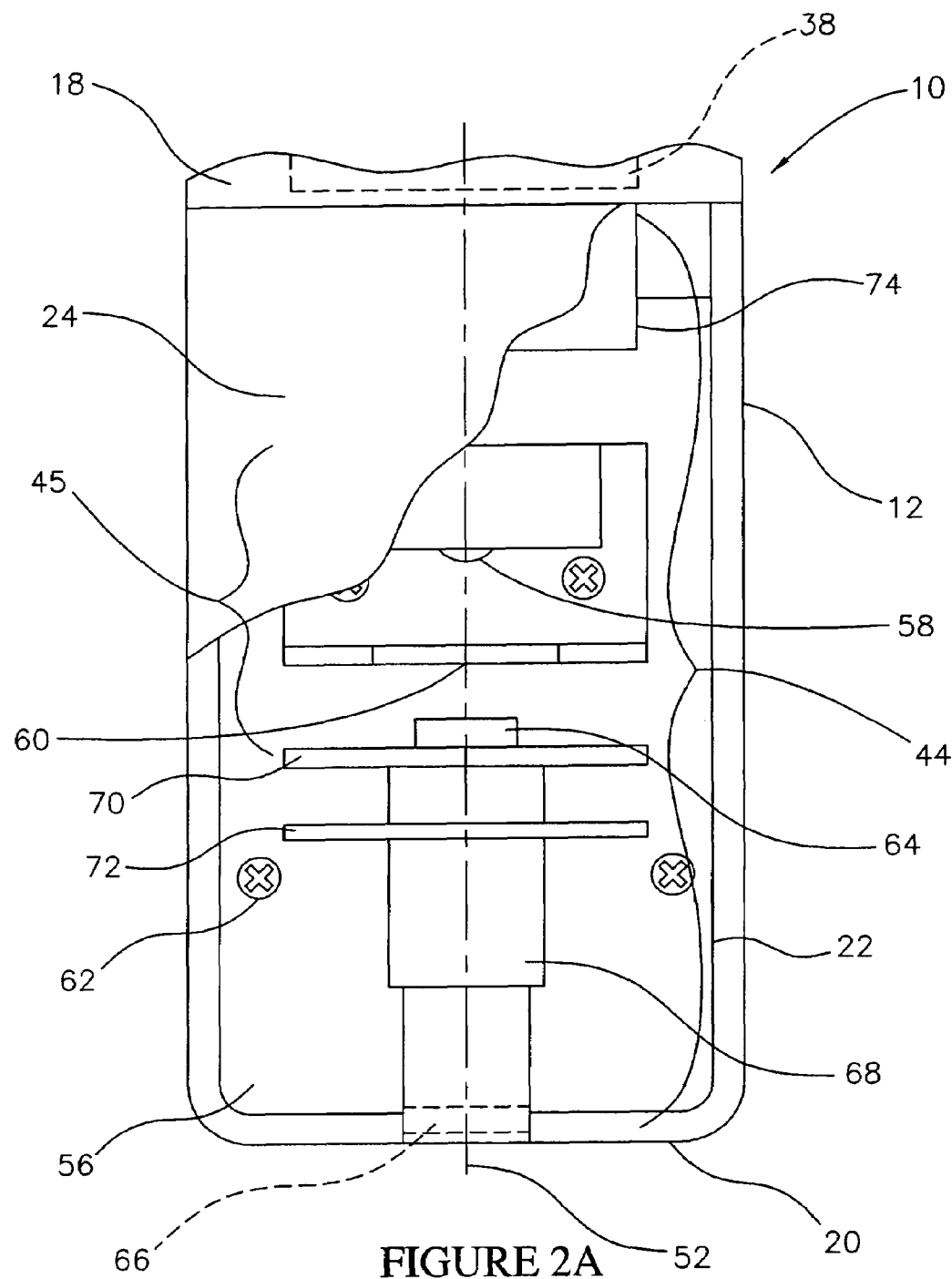
FIG. 2A is an enlarged back elevation view of the portable phone taken along line 2A of FIG. 1B illustrating an inner compartment thereof with a cover removed and the image projection system in the compartment.
Figure 2B:
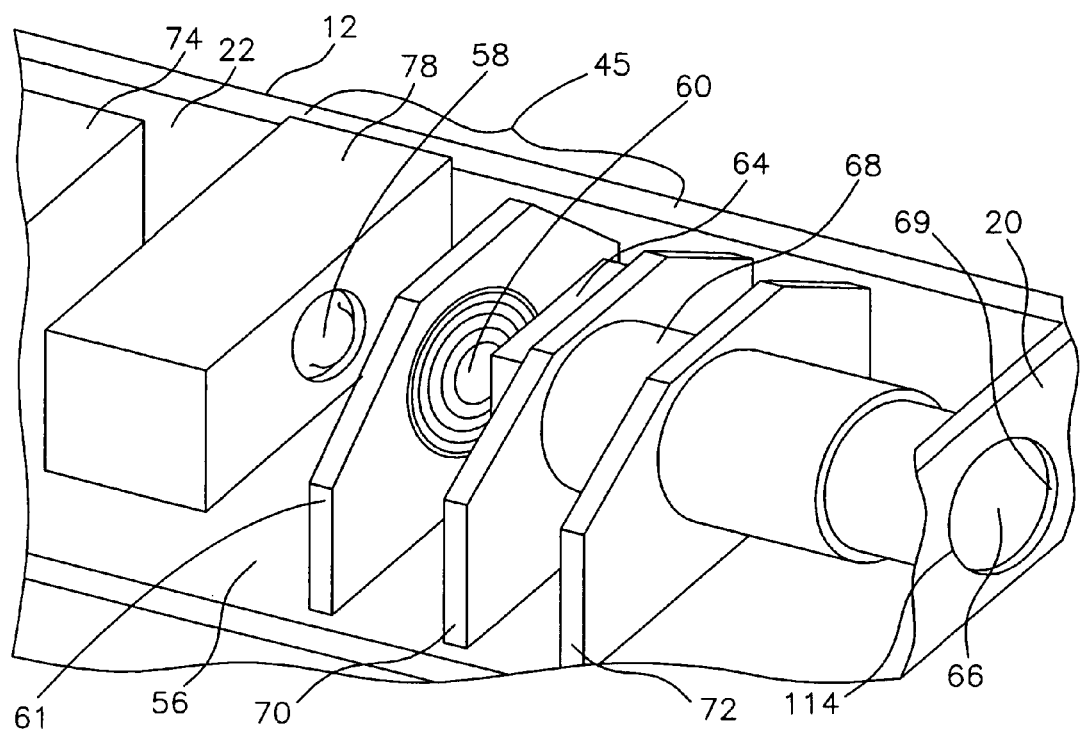
FIG. 2B is an enlarged perspective view illustrating components of the image projection system.
Figure 3E:
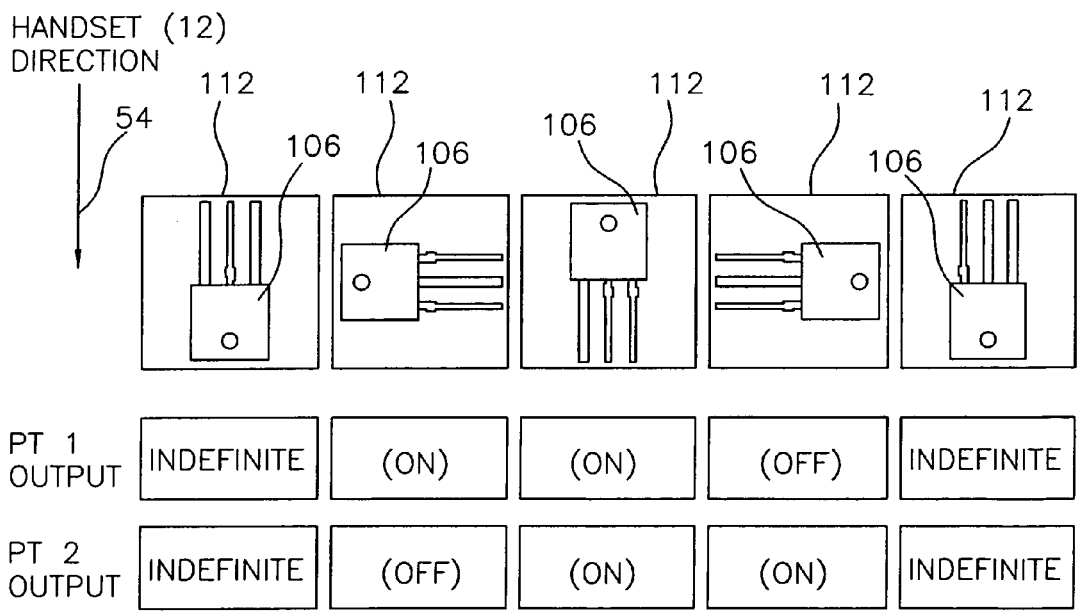
FIG. 3E is an electrical schematic of an orientation sensing system of the image projection system.
Figure 3F:
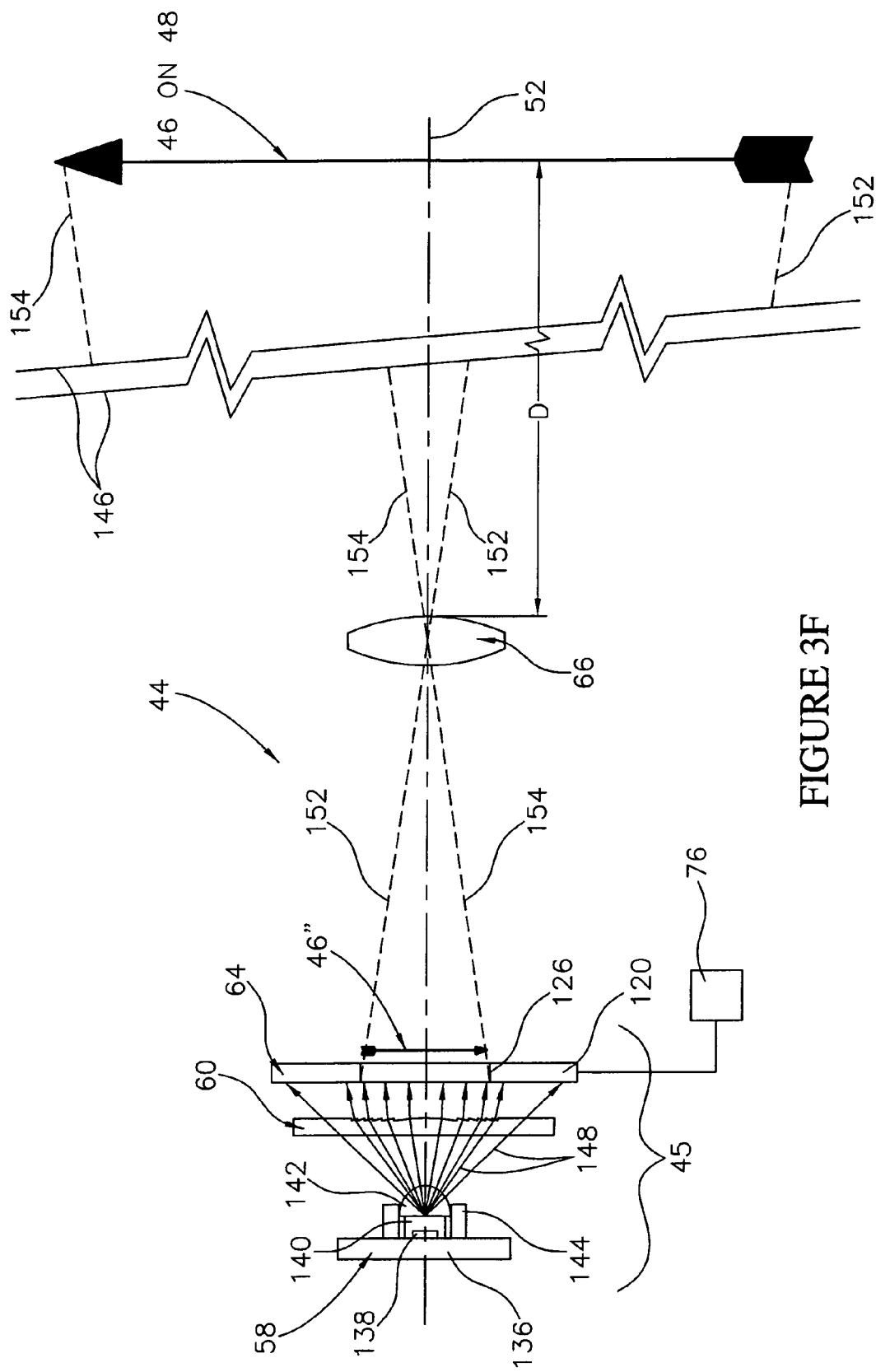
FIG. 3F is a schematic diagram illustrating the operation of the image projection system.

In the illustrative embodiment, the light source 58 (FIG. 1B) comprises a light emitting diode (LED) protruding from a sealed enclosure 78 (FIG. 2B) mounted to the base 56 (FIG. 2B). As shown in FIG. 3F, the light source 58 also includes a substrate 136, an LED chip 138 surrounded by a soft gel 140, a lens 142 which directs light forward for further processing and usage in the image projection system 44, and a lens mounting block 144 for mounting the lens 142. The substrate 136 is configured to provide an assembly platform for the light source 58 and electrical feeds to the LED chip 138. In addition, the substrate 136 provides a heat sink for the LED chip 138 directly from the LED chip 138, and from the LED chip 138 through the gel 140 to the substrate 136 as well.

The gel 140 conducts heat emitted by the LED chip 138 to the mounting block 144 and to the substrate 136, where it is dissipated. In addition, the gel 140 provides a cushion against CTE mismatch cracking of the LED chip 138, and an optical index matching medium for efficiently coupling the light output of the LED chip 138 to the optical train. In use, the gel 140, the mounting block 144 and the substrate 136 improve the performance of the light source 58. This allows the image projection system 44 to form the second visual image 46 (FIG. 3B) in a dim or a bright setting, and with the viewing surface 48 (FIG. 3B) having irregular contours and low reflectivity. With regards to the improved performance, the substrate 136 has a direct physical/thermal contact with the back of the LED chip 138, and includes a metal layer (not shown) on a back surface thereof, which functions as a heat sink for the LED chip 138.

The mounting block 144 is made of solid copper treated with a reflective coating. As with the substrate 136, the mounting block 144 also functions as a heat sink for the LED chip 138. In addition to functioning as a heat sink and a structure for mounting the lens 142, the mounting block 144 also provides a cavity for the gel 140, and a reflection mechanism for transmitting light which is on a trajectory away from the lens 142 back to the gel 140. Also in the illustrative embodiment, a flexible heat conductive matting (not shown) is placed against the light source 58 to further enhance cooling. Suitable heat conductive matting are products "WSF 16" and "WSF 32" manufactured by Fisher Electronik GmBH, having sales representation in the United States through ICS International Circus Sales, Inc. of Phoenix, Ariz.

One suitable light source 58 comprises a high brightness, gel enhanced LED light source. In the illustrative embodiment, the light source 58 includes multiple heat sinks (substrate 136 and mounting block 144) with substrate 136 in intimate contact with LED chip 138, and mounting block 144 in thermal communication with LED chip 138 through translucent gel 140. In addition, the LED chip 138 is in intimate contact with the translucent gel 140 placed between the LED chip 138 and the first set of optics 60. By way of example, the light source 58 must produce at least about 4 Lumens of light, with about 6 or more Lumens being preferred, and with about 10 or more Lumens with an FSTN LCD light valve. In addition, the light source 58 should have a density of light of at least 18 Lumens per square mm of surface area of the LED chip 138.

One suitable light source 58 comprises an Xlamp, part number XL 7090-L100-RED, Bin #R2H, manufactured by Cree, Inc., Durham, S.C. However, it is to be understood that this manufacturer and part designation, as well as others to follow, are merely exemplary, and other equivalent components can be substituted. With this light source 58, the LED chip 138 comprises an InGaAlP based LED die configured to produce red light and having dimensions of 1 mm×1 mm×0.16 mm.

In addition to the above requirements, the light source 58 preferably has a light production efficiency of greater than about 24 Lumens per watt. The above noted XL 7090-L100-RED, Bin #R2H light source 58 produces a light output having a Lambertion Spatial Pattern and an approximately 100 degree angle cone of light emission, and produces approximately 20.8 +/−2.7 Lumens of light while operating in a 25° C. environment, and drawing approximately 330 milliamps of electrical current. In the illustrative embodiment, the light source 58 has been driven with as high as about 500 milli-Amps of electrical current.

There are several options for driving the light source 58 (FIG. 1B). A first option is to use a resistor in series with the light source 58 (FIG. 1B) to limit current to an acceptable level. In this case the light source 58 (FIG. 1B) will have a 100% duty cycle during the time the light source 58 (FIG. 1B) is on.

Figure 17:
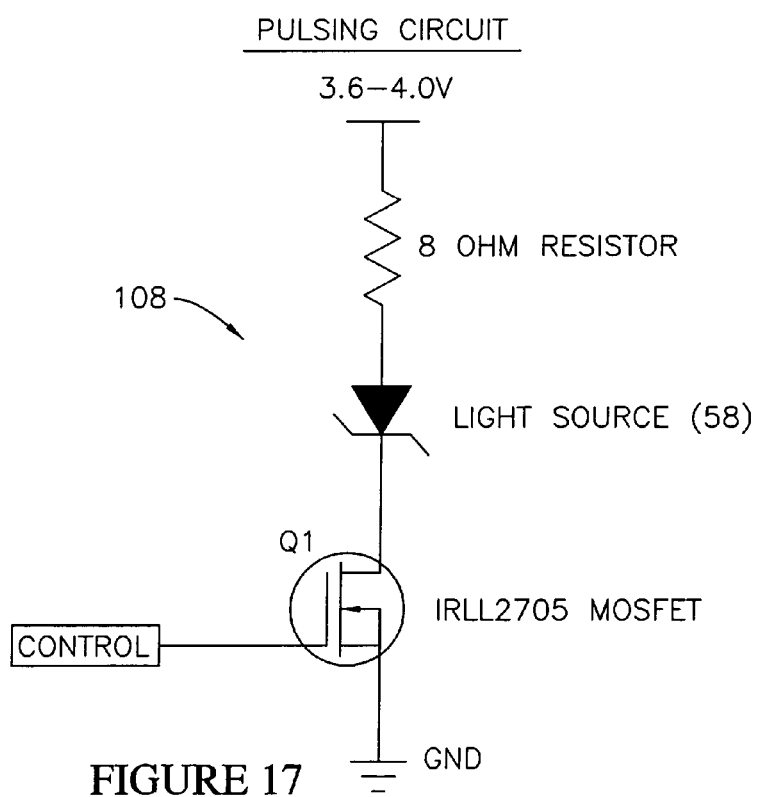
FIG. 17 is an electrical schematic of a pulsing circuit for the image projection system.

A second option is to pulse the light source 58 (FIG. 1B) with a limited duty cycle. In a pulsed mode, the human eye perceives the brightness being produced, as more than the average value being produced. This can result in a perceived improvement in image quality, at a reduced power consumption and reduced heat generation, relative to operating at a constant current. In this case, the light source 58 (FIG. 1B) can be pulsed at a higher current for short periods of time in order to make the second visual image 46 (FIG. 3B) appear brighter to the user 14 (FIG. 4A). In addition, the second visual image 46 (FIG. 3B) appears to be brighter than with an arrangement where the light source 58 is operated at a current which is lower than the peak current of a pulse, but higher than the low point of a pulse for a continuous period. As will be further explained, FIG. 17 illustrates an exemplary pulsing circuit 108 for implementing the second option.

A third option is to use a drive chip for the light source 58 (FIG. 1B). in addition, the mechanism for driving the light source 58 (FIG. 1B) can comprise a user controlled adjustment for varying the brightness of the second visual image 46, and the power consumption of the light source 58. Further, the mechanism for driving the light source 58, can contain a preset time from the manufacturer, or an adjustable time set by the user 14, which determines how long the light source 58 remains on when a call waiting signal is activated. For example, an exemplary time period can be about 15 seconds.

As shown in FIG. 3A, the light source 58 (FIG. 3A) is in signal communication with a control circuit 76 (FIG. 3A) contained on an interface board 74 (FIG. 3A). In addition, the control circuit 76 (FIG. 3A) is in signal communication with the phone circuitry 38 (FIG. 3A). As will be further explained, the control circuit 76 (FIG. 3A) is configured to control elements of the image projection system 44 responsive to signals from the phone circuitry 38 (FIG. 3A).

The electro optic system 45 (FIG. 1B) also includes a first set of optics 60 (FIG. 1B) configured to collect and process light from the light source 58 (FIG. 1B) in order to improve the brightness, contrast or image quality of the second visual image 46 (FIG. 3B). In addition, the first set of optics 60 (FIG. 1B) can be configured to process light from the light source 58 (FIG. 1B) to improve the degree of collimation of the light, and can be configured to manipulate the light in size, shape or form factor. The first set of optics 60 (FIG. 1B) can comprise a single optic element or multiple optic elements, and can include elements integrated into the light source 58 (FIG. 1B). The optic elements of the first set of optics 60 can comprise refractive optic elements, reflective optic elements, diffractive optic elements, light piping elements, or combinations thereof. An exemplary spacing between the light source 58 (FIG. 1B) and the first set of optics 60 (FIG. 1B) can be about 8 mm. The light source 58 (FIG. 1B) can also be processed through light piping, light channeling, refractive, reflective, or diffractive elements. In some cases, these elements can provide superior results relative to a light source at a distance having a physically blocking frame.

In the illustrative embodiment, the first set of optics 60 (FIG. 1B) comprises a refractive optic element in the form of a Fresnel lens contained on a frame 61 (FIG. 2B) mounted to the base 56. One suitable Fresnel lens is available from Edmund Optics Inc. of Barrington, N.J., as part number Y43-022, having a 0.5 inch lens diameter, a 0.4 inch focal length, a 0.06 inch overall lens thickness, and a Fresnel pattern formed by 250 grooves per inch. The lens is a molded acrylic lens having an index of refraction of 1.49. This lens is placed with its smooth face side facing the light source 58, and the contoured, infinite conjugate side facing the light valve 64.

The electro optic system 45 (FIG. 1B) also includes a light valve 64 (FIG. 1B), such as an LCD (liquid crystal display) or other display with transparent or translucent pixels. The light valve 64 (FIG. 1B) is configured to receive light from the light source 58 (FIG. 1B) and the first set of optics 60 (FIG. 1B), and to generate a pattern 46" (FIG. 3F) enabling the formation of the second visual image 46 (FIG. 3B) responsive to electronic signals. In the illustrative embodiment the pattern 46" varies as a function of the electronic signals. However, the light valve 64 (FIG. 1B) can also be configured to generate a fixed pattern or a pattern having both variable and fixed elements. As shown in FIG. 3A, the light valve 64 (FIG. 3A) is in signal communication with the control circuit 76 (FIG. 3A) contained on the interface board 74 (FIG. 3A). In addition, a representative spacing between the light valve 64 (FIG. 1B)

and the first set of optics 60 (FIG. 1B) can be about 5.5 mm. When the light exiting the first set of optics 60 has a high degree of collimation, the spacing distance between the light valve 64 and the first set of optics 60 can vary significantly without producing a significant effect on the second visual image 46. In addition, assembly misalignments can be more easily overcome with highly collimated light.

In the illustrative embodiment, the light valve 64 (FIG. 1B) comprises a chip on glass (COG) negative image, film compensated supertwisted nematic (FSTN) liquid crystal display (LCD) configured for generation of the second visual image 46 (FIG. 3B) as alpha numeric characters with a desired size, spacing and shape. Alternately rather than alpha numeric characters, the light valve 64 (FIG. 1B) can be configured to generate the second visual image 46 (FIG. 3B) as pictures, characters, drawings, symbols, photographs, or video information. Further, the second visual image 46 can be representative of any type of data including but not limited to music, stocks, sports, weather, traffic, news and head line data. In addition, the data can be presented in viewable segments that are scrolled into position using a button on the keypad 32 (FIG. 1A), or automatic streaming in the manner of a ticker tape machine.

Referring to FIGS. 6A-6C, the light valve 64 is shown separately. In the illustrative embodiment, the light valve 64 comprises a chip on glass liquid crystal display (LCD). The light valve 64 includes a transparent substrate 120 (FIG. 6A) having terminal leads 122 (FIG. 6A) in electrical communication with traces (not shown) on the substrate 120 (FIG. 6A). The terminal leads 122 (FIG. 6A) electrically connect the light valve 64 to the control circuit 76 (FIG. 8) for the image projection system 44 (FIG. 1B). The light valve 64 also includes a driver chip 124 (FIG. 6A) in electrical communication with the terminal leads 122 (FIG. 6A). One suitable driver chip 124 (FIG. 6A) comprises a Novatek NT7605 chip configured to include suitable drive circuitry. Alternately in place of the driver chip 124 (FIG. 6A), the drive circuitry could include circuits fabricated from amorphous silicon or polysilicon thin film transistors, or single crystal transistors integrated into the substrate 120 (FIG. 6A).

The light valve 64 also includes an active area 126 (FIG. 6A) comprising an array of character blocks 128 (FIG. 6A). The active area 126 can have a selected width and length (e.g., 2.07 millimeter×6.87 millimeter). In addition, polarizers 132, 134 (FIG. 6B) are located on opposing sides of the active area 126.

Figure 4C:
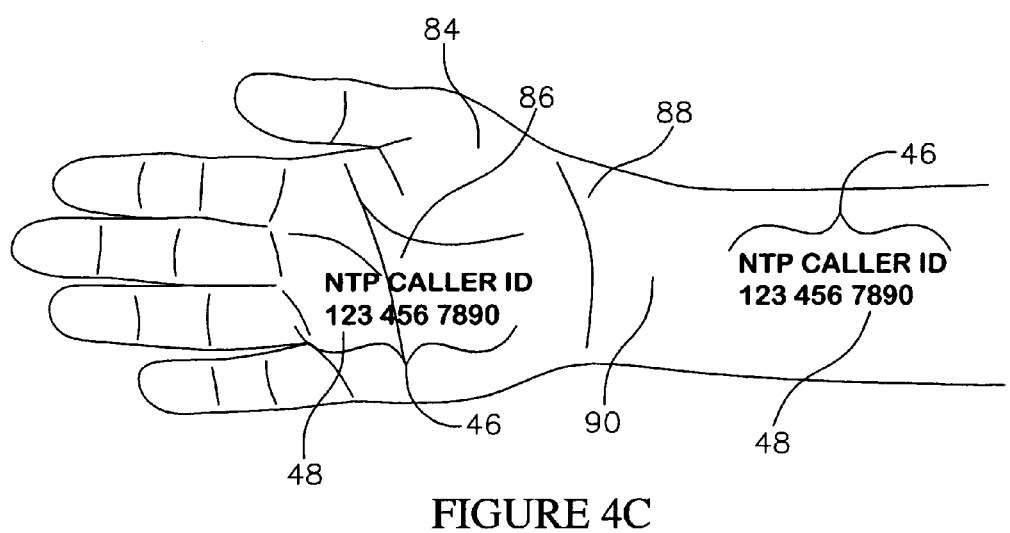
FIG. 4C is an enlarged view taken along line 4C-4C of FIG. 4A illustrating the visual image on the right hand, or alternately the right forearm, of the user.

In the illustrative embodiment, the active area 126 (FIG. 6A) comprises two rows of twelve character blocks 128 (FIG. 6A), with each block made up of an array of 5×7 rectangular pixel dots 130 (FIG. 6C). With this arrangement, the active area 126 has about 840 pixels. In order to represent a phone number twelve digits are required, including a space or dash between area code, prefix and number, and the actual ten numbers. In the illustrative embodiment, the character blocks 128 comprise pixel dots, or pixel segments, that are used to generate either numbers or letters. The number or letter capability is required because the top row of the second visual image 46 (FIG. 3B) with a left hand orientation (FIGS. 5A-5C) of the phone 10 will become the bottom row with a right hand orientation (FIG. 4A-4C). Even if a lesser esthetic option of a sixteen segment character block were used, the two row, twelve character display would consist of at least 384 pixels. Small light valves, such as the one used in the illustrative embodiment, with this number of addressable pixels require circuits integrated into the light valve substrate via direct patterning or chip on glass (COG) technology.

One suitable light valve 64 is an LCD, part number C10695 Rev 1, which was custom manufactured by Pacific Display Devices of Diamond Bar, Calif. for the phone 10. The custom LCD comprises a negative image COG FSTN LCD with a 2.07 millimeter×6.87 millimeter active area and an overall substrate 120 (FIG. 6A) size of 13 mm×15 mm. The rectangular pixels within the active area of the C10695 LCD are 0.09 mm wide and 0.13 mm high, having a spacing between pixels within a character block of 0.01 mm. The character blocks within the active area of the C10695 LCD have a vertical spacing between character blocks of 0.15 mm, and a horizontal spacing between character blocks within a row of 0.09 mm.

Figure 2C:
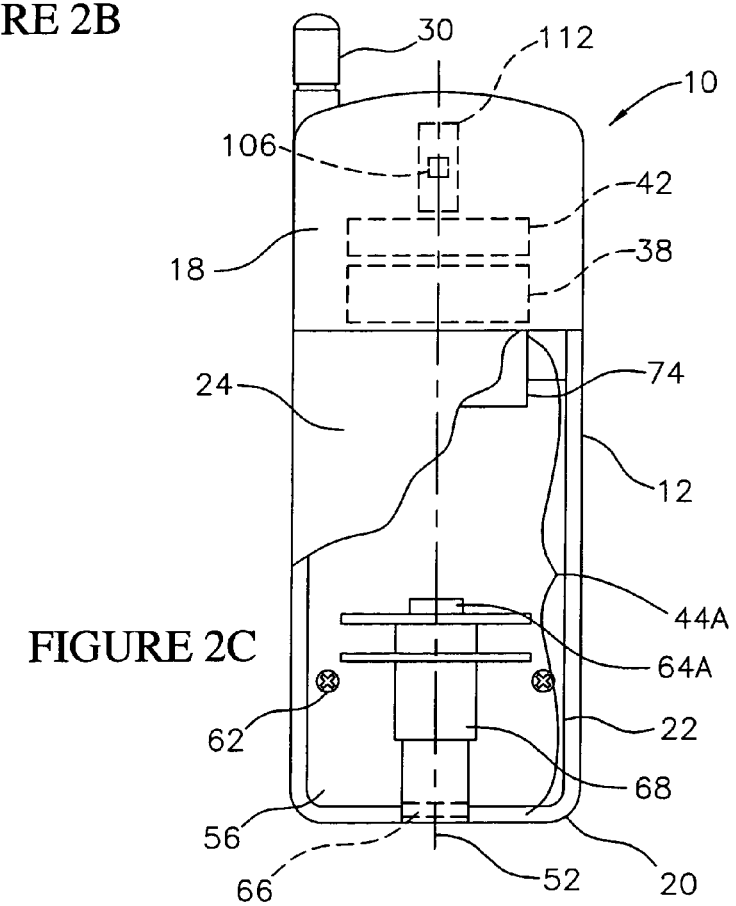
FIG. 2C is an enlarged back elevation view equivalent to FIG. 2A illustrating an alternate embodiment image projection system.

As shown in FIG. 2C, an alternate embodiment emissive electro optic system 44A includes an addressable emissive display 64A, such as an addressable patterned LED display, an organic light emitting diode (OLED), an electroluminescent display, a cathode ray tube (CRT) display, vacuum fluorescent display (VFD), a field emission display (FED) or other display having light producing pixels. In this case, the light source 58 (FIG. 2B) and the first set of optics 60 (FIG. 2B) can be eliminated.

As another alternative, the addressable emissive display 64A can be replaced by a reflective display such as a reflective liquid crystal display, a digital mirror display (DMD), a reflective LCOS display, a reflective electrochromic display or other display with reflective pixels, such that the amount or direction of the pixels reflection is variable. In an embodiment employing a reflective display, the light source 58 (FIG. 2A) and the first set of optics 60 (FIG. 2A) would be positioned such that light would be imparted onto the same side of the reflective display as the exiting light.

The image projection system 44 (FIG. 2A) also includes an optics system in the form of a second set of optics 66 (FIG. 2A) configured to receive the pattern 46" (FIG. 3F) which has been formed by the light valve 64 (FIG. 2A), to process the pattern 46" (FIG. 3F) into the mirror image 46' (FIG. 3D) of the second visual image 46 (FIG. 3B), and to project the mirror image 46' (FIG. 3D) toward the viewing surface 48 (FIG. 3B). The mirror image 46' is then reflected from the viewing surface 48 to the user 14 (FIG. 4B) as the second visual image 46 (FIG. 3B).

In the illustrative embodiment, the second set of optics 66 (FIG. 2B) is contained in a stepped tube 68 (FIG. 2B) having a mounting flange 70 (FIG. 2B) that attaches to the light valve 64 (FIG. 2B), and a mounting flange 72 (FIG. 2B) that attaches to the base 56 (FIG. 2B). In addition, the bottom end surface 20 (FIG. 2B) of the handset 12 (FIG. 2B) includes an opening 114 (FIG. 2B) for the second optics system 66 (FIG. 2B). Further, as shown in FIG. 2B, the second set of optics 66 can be recessed in the handset 12, such that the opening 114 in the bottom end surface 20 has a rim 69 which protects the second set of optics 66. The second set of optics 66 is thus less likely to be scratched or damaged by movement of the handset 12 during use and storage.

The second set of optics 66 (FIG. 2A) can include a single optical element, such as a positive convex lens, or multiple optical elements configured to project the mirror image 46' (FIG. 3D) toward the viewing surface 48 (FIG. 3B). The optical elements for the second set of optics 66 can comprise refractive optical elements, reflective optical elements, diffractive optical elements, light piping elements or combinations thereof. In addition, the second set of optics 66 (FIG. 2A) can include a focusing mechanism (not shown) configured for manually focusing the second visual image 46 (FIG. 3B) such that it is in readable focus for at least one of the user's eyes 102, 104 (FIG. 4B), when the second set of optics 66 (FIG. 3A) is at a distance D (FIG. 3A) from the viewing surface 48 (FIG. 3A). This allows the user 14 to set an offset which accommodates their particular vision and tastes. Furthermore, the second set of optics 66 can include a lens with an electrically tunable focus length such as a PAM-1000 tunable lens produced by Varioptic of Lyon, France.

In the illustrative embodiment, the second set of optics 66 (FIG. 3A) comprises a positive optical lens. One suitable lens for constructing the second set of optics 66 is an achromatic lens available from Edmund Industrial Optics, of Barrington, N.J., as part number Y45-092, having a diameter of 9 mm, an effective focal length of 27 mm and a back focal length of 24.22 mm. This lens is configured and positioned in the image projection system 44 to project along an optical axis 52 (FIG. 3A) at a distance D (FIG. 3A) to the viewing surface of about 8-16 inches.

A representative height H1 (FIG. 3B) of the individual characters on the second visual image 46 (FIG. 3B) can be 3.5 mm to 21.5 mm, with 9 mm being typical. A representative width W (FIG. 3B) of the second visual image 46 (FIG. 3B) can be from 25 mm to 152 mm depending on the distance D, the size of the active area 126 (FIG. 6A), and the configuration of the second set of optics 66 (FIG. 3A), with 64 mm being typical. A representative height H2 of the second visual image 46 (FIG. 3B) can be from 7.6 mm to 46.2 mm, with 19.3 mm being typical. A representative width to height ratio can be greater than 1.5:1, with the illustrative embodiment being 3.3:1.

FIG. 3C illustrates an alternate embodiment second visual image 46A which is formed along curved lines. This arrangement compresses the second visual image 46A so that a width W2 of the second visual image 46A is less than the width W of the second visual image 46 (FIG. 3B).

Figures 5A, 5B:
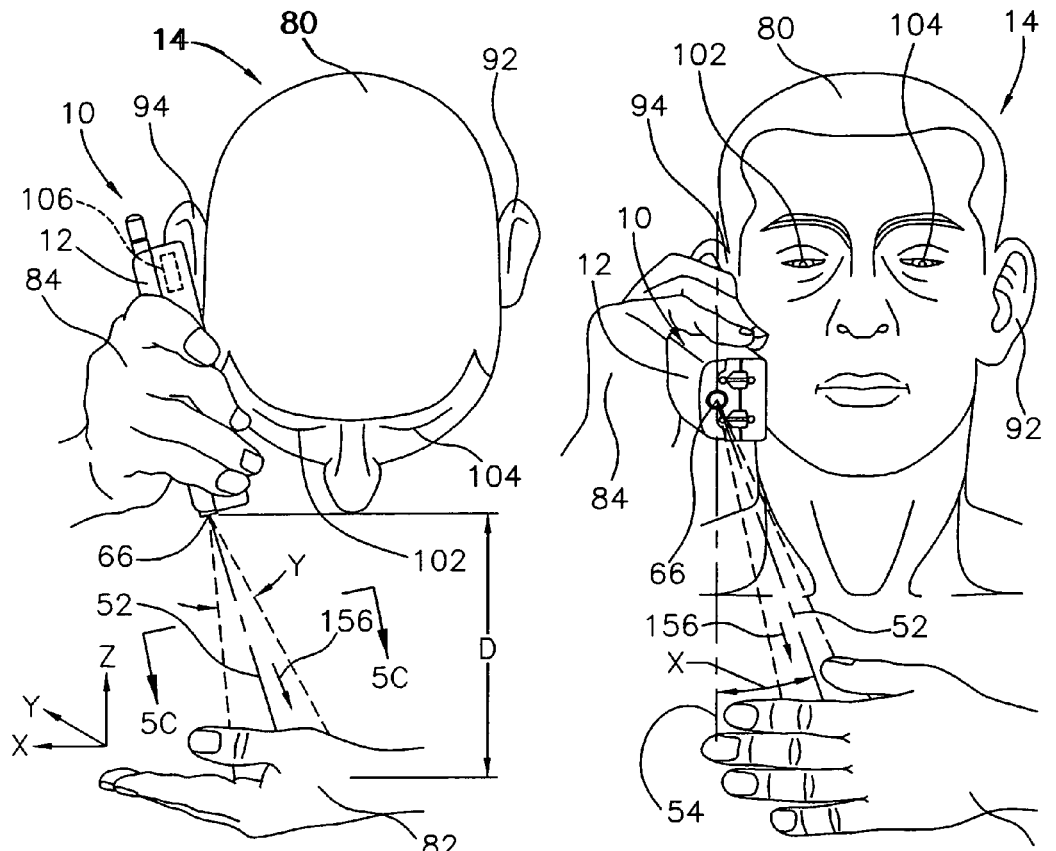
FIG. 5A is a plan view of the user engaged in a phone conversation with the portable phone held against the head with the right hand and the visual image projected onto the left hand, or alternately the left forearm.
FIG. 5B is a side elevation of FIG. 5A.
Figure 5C:
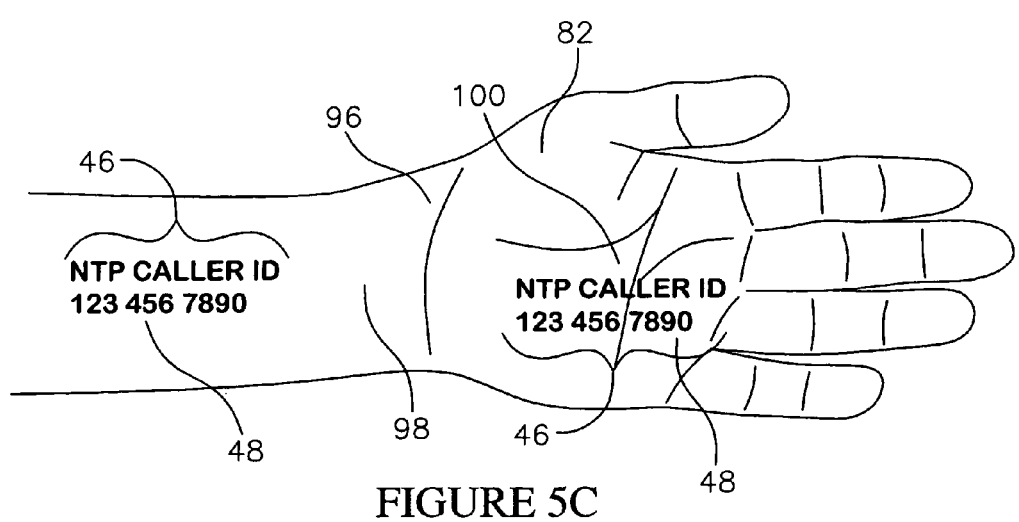
FIG. 5C is an enlarged view taken along line 5C-5C of FIG. 5A illustrating the visual image on the left hand, or alternately the left forearm, of the user.

In the illustrative embodiment, the second visual image 46 (FIG. 3B) reads from left to right. In addition, the portable phone 10 can include the orientation sensing device 106 (FIG. 3E) configured to sense the orientation of the portable phone 10 as "left hand" or "right hand" relative to the user 14 (FIG. 4A), and to orient the second visual image 46 with a left to right reading format, regardless of whether the left hand orientation or the right hand orientation of the portable phone 10 is used. For example, the portable phone 10 can be held in the left hand 82 (left hand orientation) as shown in FIGS. 4A-4C, or in the right hand 84 (left hand orientation) as shown in FIGS. 5A-5C. In either case, the orientation sensing device 106 (FIG. 3E) orients the second visual image 46 for left to right viewing by the user 14. Stated differently, the orientation sensing device 106 (FIG. 3E) is configured to rotate the second visual image 46 in the left hand orientation (FIGS. 4A-4C) 180° relative to the second visual image 46 in the right hand orientation (FIG. 5A-5C).

As shown in FIG. 1B, the orientation sensing device 106 is contained on a circuit board 112 mounted within the handset 12 (FIG. 1B). In addition, the orientation sensing device 106 is in electrical communication with a microcontroller U2 (FIG. 8) of the control circuit 76 (FIG. 8) for the image projection system 44. As shown in FIG. 3E, the orientation sensing device 106 includes output pins P1 and P2. The output from output pins P1 and P2 changes as a function of the orientation of the sensing device 106. In FIG. 3E the orientation sensing device 106 is shown in five different positions relative to a longitudinal axis 54 of the handset 12, and the corresponding output from output pins P1 and P2 is illustrated.

As illustrated in FIG. 3E, the output of pins PT1/PT2 will be high or low depending on the orientation of the orientation sensing device 106. Based on input from the pins PT1/PT2, the microcontroller U2 (FIG. 8) of the control circuit 76 (FIG. 8) controls the light valve 64 (FIG. 1B) to orient the mirror image 46' of the second visual image 46 (FIG. 3D) in position A (FIG. 3D) or position B (FIG. 3D). One suitable orientation sensing device 106 is available from Sharp Electronics of the Americas of Camas, Wash., and is designated a photointerrupter for detecting tilt direction, part number GP1S36. Alternately, a manual switch, a voice command switch, a soft key, or a keyed in sequence can be used to change the orientation of the second visual image 46 (FIG. 3B).

Figure 8:
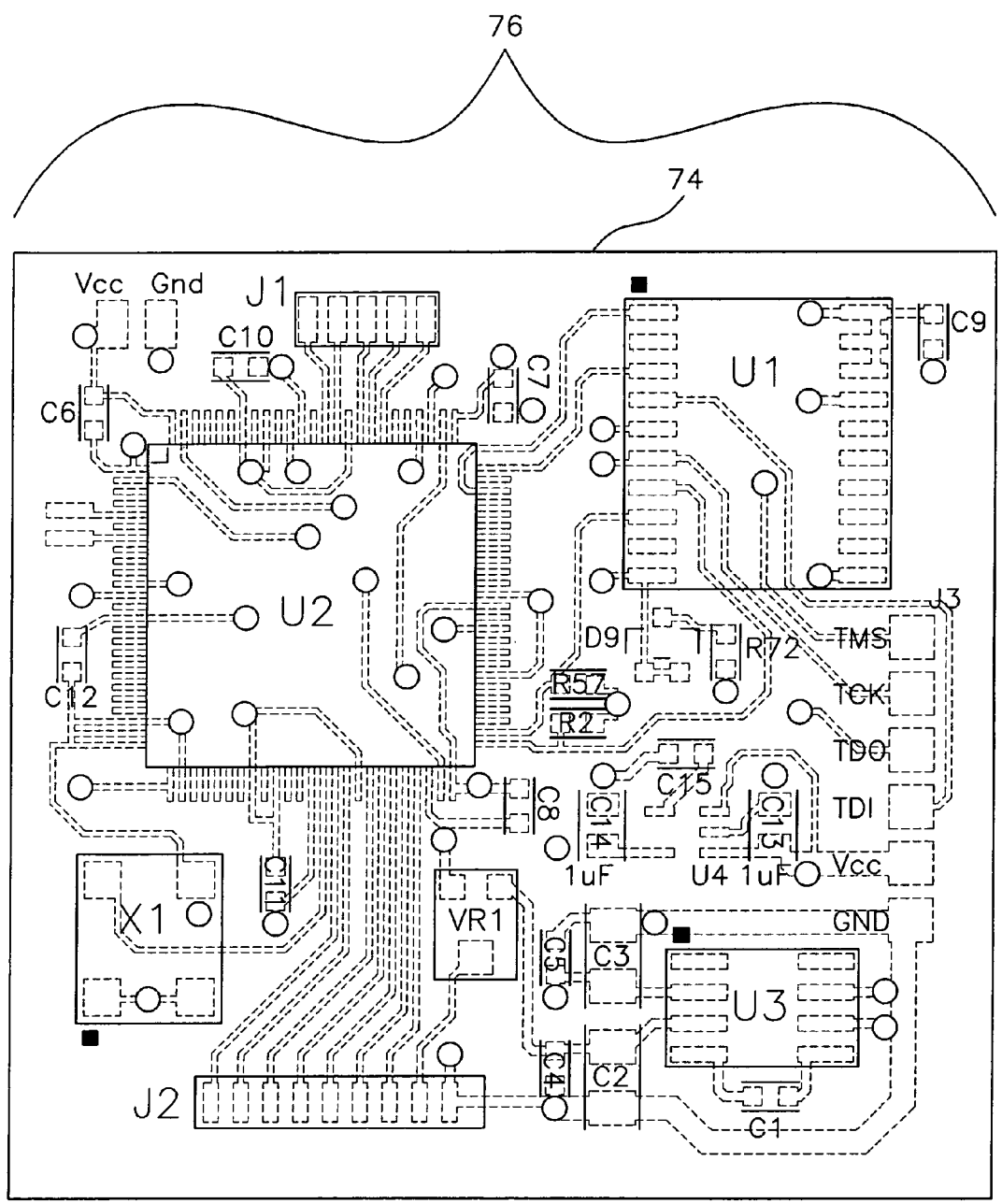
FIG. 8 is a plan view of an interface board containing the control circuit for the image projection system.

Referring to FIG. 3F, the operation of the image projection system 44 is illustrated. The image projection system 44 includes the electro optic system 45 which comprises the light source 58, the first set of optics 60 and the light valve 64 configured to generate the pattern 46" responsive to control signals from the control circuit 76 (FIG. 8). In addition, the image projection system 44 includes the second set of optics 66 configured to process the pattern 46" into the mirror image 46' of the second visual image 46 and to project the mirror image 46' (FIG. 3D) onto the viewing surface 48.

In FIG. 3F, there are break lines 146 between the second set of optics 66 and the second visual image 46 on the viewing surface 48. The break lines 146 are required to show relative proportions without having to show the actual length of distance D, which is the distance between the second set of optics 66 and the viewing surface 48. In addition, the second visual image 46 is depicted as it would appear in an edge view, and is illustrated as an arrow because it's size can change depending on the distance D. The pattern 46" generated by the light valve 64 is also depicted as an arrow. The arrows provide an orientation comparison of the pattern 46" generated by the light valve 64 relative to the second visual image 46. In addition, the arrows show that the size of the second visual image 46 is larger than the pattern 46" produced by the light valve 64. In accordance with the invention, the handset 12 and the viewing surface 48 can be manipulated by the user 14 (FIG. 4A) to vary the distance D to provide ergonomic and readable viewing of the second visual image 46.

As shown in FIG. 3F, the light source 58 generates an emission cone of light rays 148 having a relatively large angle. In FIG. 3F, the light rays 148 emitted by the light source are shown as solid lines with arrow heads at their point of entry with the light valve 64. The dashed optical tracing lines 152 (FIG. 3F) and 154 (FIG. 3F), are shown converging from the ends of pattern 46" toward the second set of optics 66 (FIG. 3F), where the lines cross, and are then shown as diverging from the second set of optics 66 (FIG. 3F) toward the viewing surface 48 (FIG. 3F)

Some of the light rays 148 from the light source 58 disperse as indicated, the light rays 148, which are collected, collimated and directed by the first set of optics 60 towards the active area 126 of the light valve 64, are used to produce the pattern 46". The light rays 148 which will become collimated, narrow angle light rays after passing through the first set of optics 60, will pass through the light valve 64 more effectively than wide angle light from the light source 58, resulting in the second visual image 46 having improved brightness, contrast or image quality, particularly when the light valve 64 comprises an LCD. Furthermore, collimating the light rays 148 and reducing the spread of light, wastes less light. This is because more light will fall on the active area 126 of the light valve 64 (FIG. 3F), and less light will fall outside the active area 126. The more nearly the cross section of the beam of collimated light rays 148 traveling from the first set of optics 66 to the light valve 64, matches the size and shape of the active area 126, the brighter the second visual image 46 will be.

As previously explained, the mirror image 46' (FIG. 3F) of the second visual image 46 may be reflected to the eyes 102, 104 (FIG. 4A) of the user 14 from the viewing surface 48 which can be a body part (e.g., hands 82, 84), or other convenient or ergonomically beneficial surface. This arrangement, although effective, has trade offs in optical performance, because of the relatively low reflectivity, and surface contours of body parts, which are not flat, smooth and planar. Because of the optical performance trade offs resulting from the viewing surface 48 being less than ideal, the first set of optics 60 serves a critical function in increasing the brightness of the second visual image 46. The control circuit 76 (FIG. 8) can also include circuit elements and external controls on the handset 12 configured to increase or decrease the brightness of the light source 58 and the second visual image 46. The control circuit 76 (FIG. 8) can also include circuit elements and external sensors configured to sense ambient brightness, and then increase or decrease the brightness of the light source 58 and the second visual image 46 as a function of the ambient brightness.

In the case where the active area 126 (FIG. 3F) of the light valve 64 (FIG. 3F) has a width greater than its height, the first set of optics 60 (FIG. 3F) may be configured to process the light rays 148 (FIG. 3F) from the light source 58 (FIG. 3F) asymmetrically, expanding the beam in one dimension more than another, or alternatively shrinking it in one dimension more than another. Any number of approaches using refractive, diffractive, reflective and light piping optical elements may be employed. One such approach would be to employ refractive optic elements or refractive optic surfaces in the first set of optics 60, which have different focal lengths along the width axis and height axis of the light valve 64. Another such approach would be to employ a round-to-rectangle tapered fiber optic bundle in the first set of optics 60. Exemplary round-to-rectangle tapered fiber optic bundles are available through Schott North America Inc., of Southbridge, Mass., and are referred to as fused fiber optic tapers. Further examples are available from Fiber Optics Technology Inc., of Pomfret, Conn.

The light valve 64 (FIG. 3F) using control signals from the control circuit 76 (FIG. 8) transforms the light rays 148 into the pattern 46" (FIG. 3F), which after being processed by the second set of optics 66 (FIG. 3F) becomes the mirror image 46' (FIG. 3D) of the second visual image 46. The mirror image 46' (FIG. 3D) is projected by the second set of optics 66 (FIG. 3F) onto the viewing surface 48, and is reflected off the viewing surface 48 to become the second visual image 46. As previously stated, the distance D between the viewing surface 48 and the second set of optics 66 can be selected to provide an ergonomically viewable second image 46 for the user 14.

Shortening the distance between the light valve 64 (FIG. 3F) and the last element of the second set of optics 66 (FIG. 3F) can be used to provide more available space inside the handset 12 for other components and systems of the portable phone 10. This can be particularly beneficial in cellular phones, which are typically the smallest portable phones. The optical elements of the second set of optics 66 (FIG. 3F) can be configured to achieve a shorter distance between the light valve 64 (FIG. 3F) and the final optic element of the second set of optics 66 (FIG. 3F), relative to that of a single positive lens. In addition, the second set of optics 66 (FIG. 3F) can be configured to maintain a same size for the second visual image 46 at substantially the same distance D. Although such an approach may add cost and complexity to the second set of optics 66, overall benefits in space savings may be achieved.

One such approach is to project a converging image away from the second set of optics 66, as opposed to the diverging image shown in 3F. The converging image reaches a crossing point between the second set of optics 66 and the viewing surface 48 where the image inverts and begins expanding. Another approach for reducing the distance from the light valve 64 to the second set of optics 66 is to employ a single refractive positive lens with a shorter focal length, and a light valve 64 with a smaller active area. When the pattern 46" formed by the light valve 64 is wider than its height, and a single positive lens is used for the second set of optics 66, a rectangular or elliptical shaped outer perimeter of the lens can be utilized, resulting in a reduction in size, relative to a lens having a fixed diameter, and without substantially compromising the quality of the second visual image 46.

Referring to FIGS. 4A-4C, the portable phone 10 is illustrated in use by the user 14 during a phone conversation with a left hand orientation. In FIGS. 4A-4C, the orientation sensing device 106 (FIG. 4A) senses the left hand orientation of the handset 12, and orients the mirror image 46' (FIG. 3D) of the second visual image 46 (FIG. 4C) projecting from the second set of optics 66 (FIG. 3D) with the orientation A (FIG. 3D). In this case, the mirror image 46' (FIG. 3D) projects from the second set of optics 66 (FIG. 3D) oriented approximately 90° to the surfaces 16, 18 (FIG. 3D), and with the alpha numeric characters reading in a direction extending from the back surface 18 (FIG. 3D) towards the front surface 16 (FIG. 3D) of the handset 12 (FIG. 3D).

Also in FIGS. 4A-4C, the user 14 holds the handset 12 in the left hand 82 with the speaker 26 held against or proximate to the left ear 92. In addition, the mirror image 46' (FIG. 3D) is projected onto the viewing surface 48 (FIG. 4C) which comprises the open palm 86 (FIG. 4C) of the right hand 84 (FIG. 4C). The mirror image 46' (FIG. 3D) is projected orthogonally relative to the front surface 16 (FIG. 3D) of the handset 12, along a vector 156 (FIGS. 4A and 4B) which extends in a direction from the speaker 26 (FIG. 1A) towards the microphone 28 (FIG. 1A) of the handset 12. Stated differently, the vector 156 has a direction traveling away from the bottom of the handset 12. The direction of the vector 156 is controlled by the user 14 moving the handset 12 about the head 80 and the ear 94. At the same time, the user 14 can move the viewing surface 48 such that the projection of the mirror image 46" (FIG. 3D) intersects the viewing surface 48. The unique configuration of the image projection system 44 (FIG. 1B) in the handset 12 allows great flexibility in controlling the location, size and focus of the second visual image 46. This is because the image projection system 44 (FIG. 1B), being fixedly attached to the handset 12, has a fixed orientation in the handset 12, which eliminates the need for additional mechanical devices to control the direction of the vector 156. The image projection system 44 is in effect part of the handset 12, and is controlled by movement of the handset 12.

The user 14 can control the location, the size and the focus of the second visual image 46 (FIG. 4C) by manipulating the handset 12 (FIG. 4B), such as by rotating the handset 12 (FIG. 4B) about the left ear 92 (FIG. 4B), and by slanting a longitudinal axis 54 (FIG. 4B) of the handset 12 (FIG. 4B) relative to the head 80 (FIG. 4B). The handset 12 (FIG. 4B) can also be moved by small amounts in the X, Y and Z directions, and rotated slightly about the longitudinal axis 54 (FIG. 4B) as well. In addition, the right hand 84 (FIG. 4C) of the user 14 can be moved in X, Y and Z directions and rotated as well, such that the second visual image 46 (FIG. 4C) is located and focused at a position in front of the eyes 102, 104 (FIG. 4B), and at a distance D (FIG. 4A) from the second optics system 66 (FIG. 4A) that permits clear viewing of the second visual image 46 (FIG. 4A). The handset 12, and the configuration of the image projection system 44 in the handset 12, provide a mechanism for pointing and projecting the mirror image 46" (FIG. 3D) at the viewing surface 48.

By way of example, an optical axis 52 (FIG. 4B) of the image projection system 44 (FIG. 3A) can be constructed with an angle X (FIG. 4B) of from 0° to 45° relative to a longitudinal axis 54 (FIG. 4B) of the handset 12 (FIG. 4B), with approximately 0° being preferred. In addition, the image projection system 44 (FIG. 3A) can be constructed, such that an angle Y (FIG. 4A) of the second visual image 46 can be from 5° to 75°, with 11° to 28°, being preferred.

Alternately, the mirror image 46' (FIG. 3D) can be projected onto another body part, such as the wrist 88 (FIG. 4C) or the forearm 90 (FIG. 4C). Rather than a body part, the mirror image 46' (FIG. 3D) can be projected upon another surface, such as clothing, or furniture, such as the back of an airplane seat, or a hinged dining table attached to the seat. In this regard, the viewing surface 48 (FIG. 3A) can comprise any surface in close proximity to the user's eyes 102, 104 (FIG. 4B) and the handset 12 (FIG. 4B), while the portable phone 10 is in use during a phone conversation. In addition, the viewing surface 48 (FIG. 3A) is preferably in a direct line of sight with the user's eyes 102, 104 (FIG. 4B) while the speaker 26 (FIG. 1A) is proximate to the user's ear 92 (FIG. 4B).

Further, the handset 12 (FIG. 4B) and the image protection system 44 (FIG. 3A) can be used while the user 14 (FIG. 4B) is sitting, standing, laying down or moving. In addition to providing ergonomic viewing by the user 14 (FIG. 4B) during a phone conversation, the viewing surface 48 (FIG. 4C) can be located such that that background light and glare can be reduced or substantially eliminated. Also, the handset 12 (FIG. 4B) is under hand control, and can be quickly moved and manipulated by the user 14 (FIG. 4B) to make the second visual image 46 (FIG. 4C) focused and readable. The handset 12 (FIG. 4B) becomes another appendage of the user 14 due to the placement and function of the image projection system 44 (FIG. 3A) within the handset 12.

Still further, the viewing surface 48 (FIG. 4C) can be located such that the user 14 (FIG. 4B) can easily view the second visual image 46 (FIG. 4C), while other persons cannot see the second visual image 46 (FIG. 4C). This provides some measure of privacy, particularly over systems such as voice boxes. In addition, privacy can be achieved because the user 14 (FIG. 4B) can control the viewing surface 48 (FIG. 4C), and the focus of the second visual image 46 (FIG. 4C) as well. Accordingly, if the user 14 (FIG. 4B) wishes another person to view the visual image 46 (FIG. 46), the viewing surface 48 can be moved or another viewing surface 48 can be selected, such that the data can be shared, but without interruption of a phone conversation.

Referring to FIGS. 5A-5C, the portable phone 10 is illustrated in use by the user 14 during a phone conversation with a right hand orientation. With the right hand orientation, the user 14 holds the handset 12 (FIG. 5B) in the right hand 84 (FIG. 5B) with the speaker 26 (FIG. 1A) held against or proximate to the right ear 94 (FIG. 5B). In addition, the user 14 moves the left hand 82 (FIG. 5B) to locate and focus the image 46 (FIG. 5C) in the direction of vector 156, substantially as previously described. As with the left hand orientation (FIGS. 4A-4C), the second visual image 46 reads from left to right. This requires that the orientation sensing device 106 (FIG. 5A) rotate the mirror image 46' (FIG. 3D) by 180° from orientation A (FIG. 3D) to orientation B (FIG. 3D). In addition, the mirror image 46' of the second visual image 46 (FIG. 3D) projects from the second optics system 66 (FIG. 3D) oriented approximately 90° to the surfaces 16, 18 (FIG. 3D), and with a row of alpha numeric characters reading in a direction extending from the front surface 16 (FIG. 3D) towards the back surface 18 (FIG. 3D) of the handset 12 (FIG. 3D).

Figure 7A:
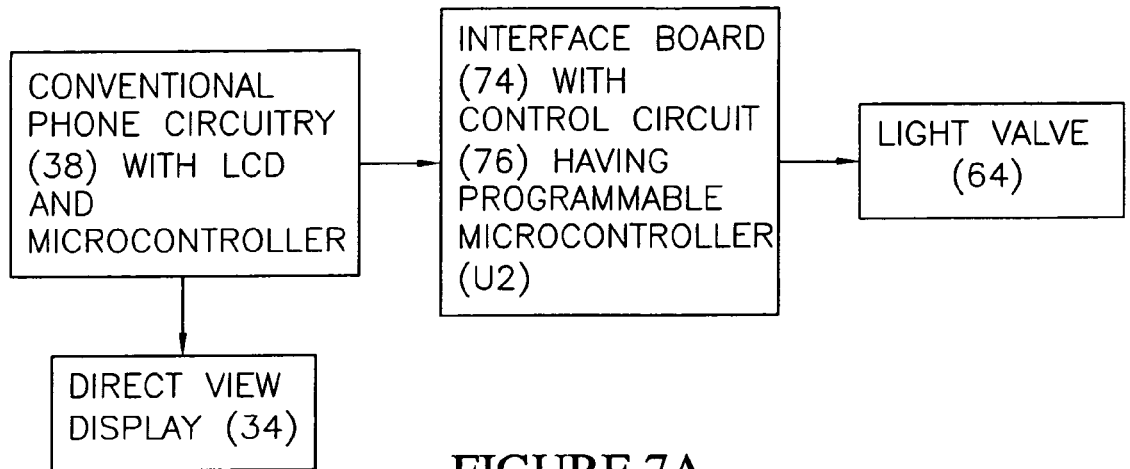
FIG. 7A is an electrical block diagram of a control circuit for the image projection system and it's interface with conventional phone circuitry.

Referring to FIG. 7A, a block diagram illustrates the interface of the control circuit 76 with the conventional phone circuitry 38. In the illustrative embodiment, the conventional phone circuitry 38 included a direct view LCD and a microcontroller configured to generate visual data for the phone direct view display 34 (FIG. 1A).

The control circuit 76 is contained on the interface board 74 which is mounted within the portable phone 10. In addition, as will be further explained, the control circuit 76 includes a programmable microcontroller U2 (FIG. 8). The control circuit 76 is in electrical communication with the conventional phone circuitry 38, and converts the same signals used to generate the visual data for the direct view display 34 (FIG. 1A) to a format suitable for driving the light valve 64 (FIG. 1B) of the image projection system 44 (FIG. 1B).

In the illustrative embodiment, the control circuit 76 is required because the signals from the conventional phone circuitry 38 cannot directly drive the light valve 64 (FIG. 1B) of the image projection system 44 (FIG. 3A). In the illustrative embodiment, the conventional phone circuitry 38 of the previously identified Uniden cordless phone uses a four wire serial configuration, which was converted by the control circuit 76 to a four bit parallel interface suitable for driving the light valve 64 (FIG. 1B). However, the control circuit 76 can be constructed to convert signals from any conventional phone circuitry including 2, 3 or 4 wire serial configurations.

Figure 7B:
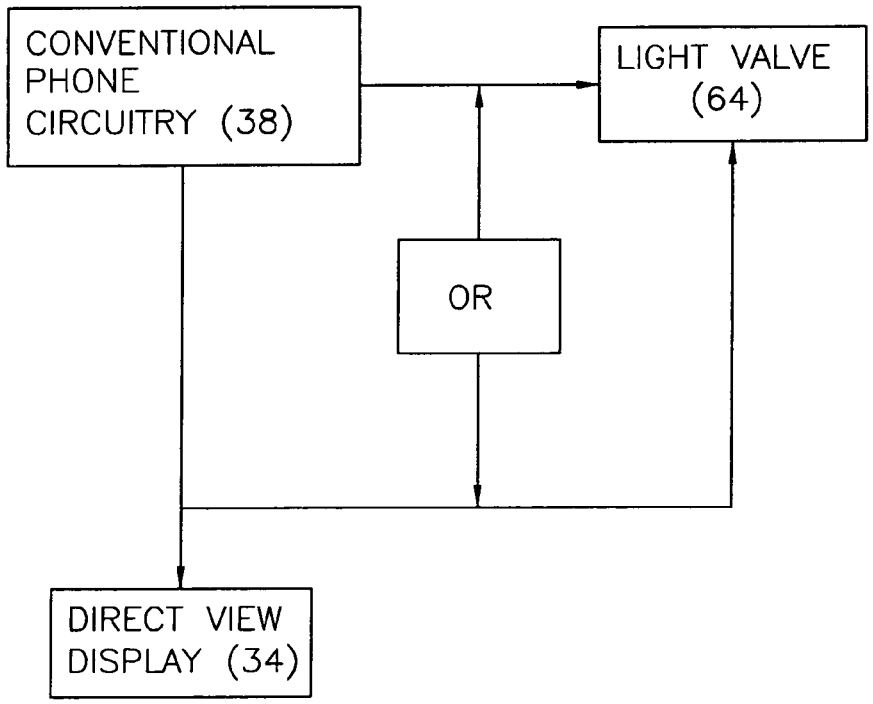
FIG. 7B is an electrical block diagram of an alternate embodiment control circuit for the image projection system.

Referring to FIG. 7B, a block diagram illustrates an alternate interface in which signals from the conventional phone circuitry 38 are used to directly drive the light valve 64 (FIG. 1B) of the image projection system 44 (FIG. 1B). In this case, the direct view display 34 (FIG. 1A) and the light valve 64 (FIG. 1B) use the same interface. As another alternative, if the direct view display 34 (FIG. 1A) uses a different interface than the light valve 64 (FIG. 1B), then the programmable microcontroller U2 can be programmed to convert the signals required to drive the light valve 64 (FIG. 1B).

Referring to FIG. 8, the interface board 74 and the control circuit 76 are illustrated. The control circuit 76 performs several functions during operation of the image projection system 44. A first function of the control circuit 76 is to initialize the light valve 64 (FIG. 1B) and load a correct register setting at startup. In this regard, the driver chip 124 (FIG. 6A) of the light valve 64 (FIG. 6A) has different options for displaying the second image 46 (FIG. 3B) and the control circuit 76 is used to select and load these options at start up.

A second function of the control circuit 76 is to take serial data from the phone circuitry 38 (FIG. 1B) and convert this data to a serial format required by the light valve 64 (FIG. 1B).

A third function of the control circuit 76 is to control the activation of the light source 58 (FIG. 1B). If desired, the light source 58 (FIG. 1B) can be activated after a set time period (e.g., several seconds or more) following the initial reception of the caller waiting ID signals.

The control circuit 76 includes a field programmable gate array (FPGA) microcontroller U2 and supporting components. EPROM U1 comprises a reprogrammable configuration PROM for the microcontroller U2. Software is loaded into the EPROM U1 and is loaded into the microcontroller U2 during start up. Oscillator X1 is an oscillator which provides a continuous clock signal and a system clock for the microcontroller U2. A clock signal from the phone circuitry 38 (FIG. 1B) could alternately be used, but the oscillator X1 provides a known clock signal.

The control circuit 76 also include a 2.5 volt linear regulator U4 which provides power to the microcontroller U2. In the illustrative embodiment component U3 is not used. There are also six pins on the interface board 74 which are connected to the EPROM U1. These pins allow new software to be downloaded through a cable (not shown) connected to a computer (not shown) which allows for updates to the software. The interface board 74 also includes input pads in electrical communication with the phone circuitry 38 (FIG. 1B). The interface board 74 also includes output pads in electrical communication with the light valve 64 (FIG. 1B) and the light source 58 (FIG. 1B).

The following Table I identifies the components on the interface board 74. In addition, dotted circuit traces in FIG. 8 illustrate the interconnection of the components on the interface board 74. In Table I the supplier "Digi-Key" is the Digi-Key Corporation, of Thief River Falls, Minn.

Figure 14:
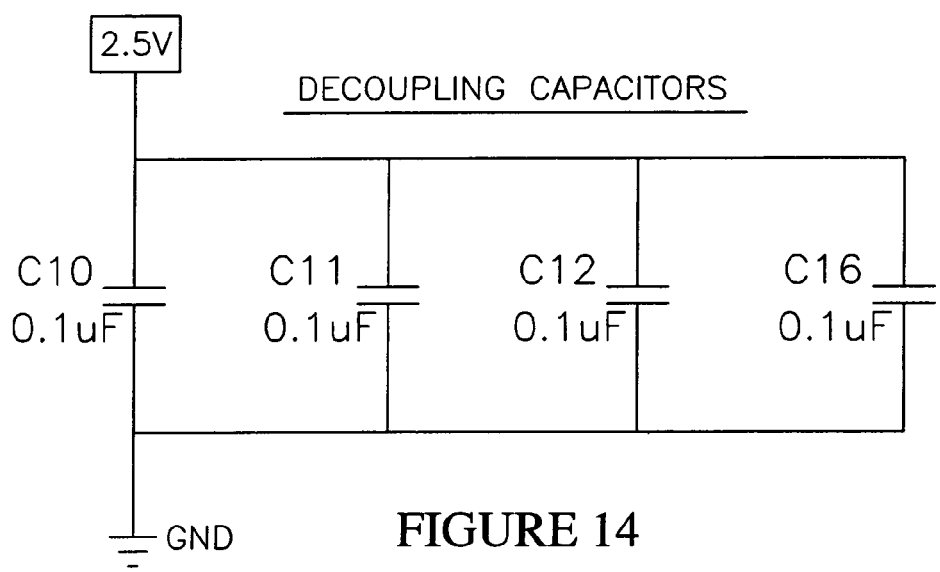
FIG. 14 is an electrical schematic of decoupling capacitors of the control circuit.

In FIG. 14, an electrical schematic of decoupling capacitors C10 are illustrated.

Figure 15:
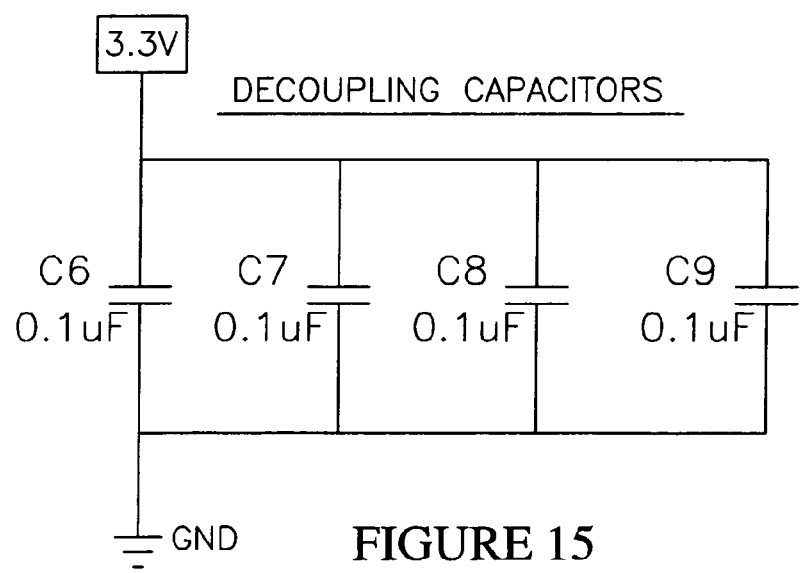
FIG. 15 is an electrical schematic of decoupling capacitors of the control circuit.

In FIG. 15 an electrical schematic of decoupling capacitors C6 are illustrated.

Figure 16:
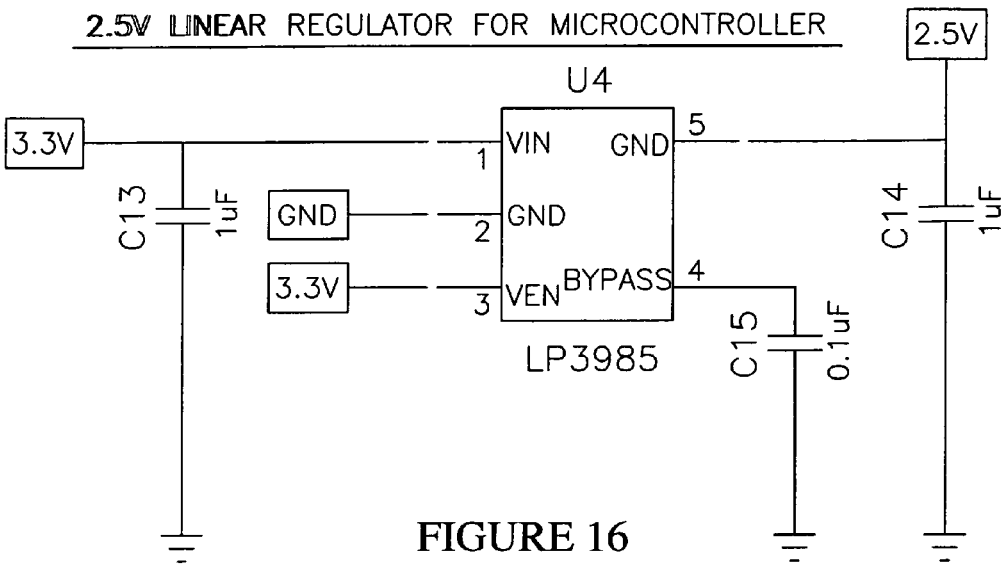
FIG. 16 is an electrical schematic of a 2.5V linear regulator for the microcontroller of the control circuit.

In FIG. 16, an electrical schematic of a 2.5 volt linear regulator U4 for the microcontroller U2 is illustrated.

Referring to FIG. 17, a pulsing circuit 108 for pulsing the light source 58 is illustrated. The pulsing circuit 108 is configured to pulse a driving current to the light source 58 such that a high current is followed by a low current or no current. This pulses the second visual image 46 (FIG. 3B) from a first intensity (i.e., bright) to a second intensity (i.e., dim). This reduces power consumption and heat generation relative to a constant current. The pulsing circuit 108 includes a transistor Q1 configured to cycle current to the light source 58 responsive to control signals. In the illustrative embodiment, tran-

TABLE I

Interface Board Components

| Designator | Description | Supplier | Part No. |
| --- | --- | --- | --- |
| VR1 | 10K Ohm 3MM Potentiometer | Digi-Key | 303UC103ECT-ND |
| R2 | 5.6K Ohm 0603 SMT Resistor | Digi-Key | 3115.6KGCT-ND |
| R57 | 5.6K Ohm 0603 SMT Resistor | Digi-Key | 3115.6KGCT-ND |
| C1 | 603 0.1 uF Ceramic capacitor | Digi-Key | PCC2277CT-ND |
| C2 | Not Used | | |
| C3 | Not Used | | |
| C4 | 603 0.1 uF Ceramic Capacitor | Digi-Key | PCC2277CT-ND |
| C5 | 603 0.1 uF Ceramic Capacitor | Digi-Key | PCC2277CT-ND |
| C6 | 603 0.1 uF Ceramic Capacitor | Digi-Key | PCC2277CT-ND |
| C7 | 603 0.1 uF Ceramic Capacitor | Digi-Key | PCC2277CT-ND |
| C8 | 603 0.1 uF Ceramic Capacitor | Digi-Key | PCC2277CT-ND |
| C9 | 603 0.1 uF Ceramic Capacitor | Digi-Key | PCC2277CT-ND |
| C10 | 603 0.1 uF Ceramic Capacitor | Digi-Key | PCC2277CT-ND |
| C11 | 603 0.1 uF Ceramic Capacitor | Digi-Key | PCC2277CT-ND |
| C12 | 603 0.1 uF Ceramic Capacitor | Digi-Key | PCC2277CT-ND |
| C13 | 805 1 uF Ceramic Capacitor | Digi-Key | PCC2314CT-ND |
| C14 | 805 1 uF Ceramic Capacitor | Digi-Key | PCC2314CT-ND |
| C15 | 603 0.1 uF Ceramic Capacitor | Digi-Key | PCC2277CT-ND |
| C16 | 603 0.1 uF Ceramic Capacitor | Digi-Key | PCC2277CT-ND |
| J1 | Phone Connector No component 0.05" Pitch pads | | Solder wires |
| J2 | LCD Connector No component 0.05" Pitch pads | | Solder wires |
| J3 | Header Connector 0.100" Pitch | Digi-Key | A26508-ND |
| U1 | Xc18V512SO20C Configuration PROM | Digi-Key | 122-1240-ND |
| U2 | Xilinx Spartan II | Digi-Key | 122-1219-ND |
| U3 | Not Used | | |
| U4 | 2.5 V Linear Regulator | Digi-Key | LP39851M5-2.5CT-ND |
| X1 | 8.0 MHz Oscillator | Digi-Key | 300-7204-1-ND |

Figure 9:
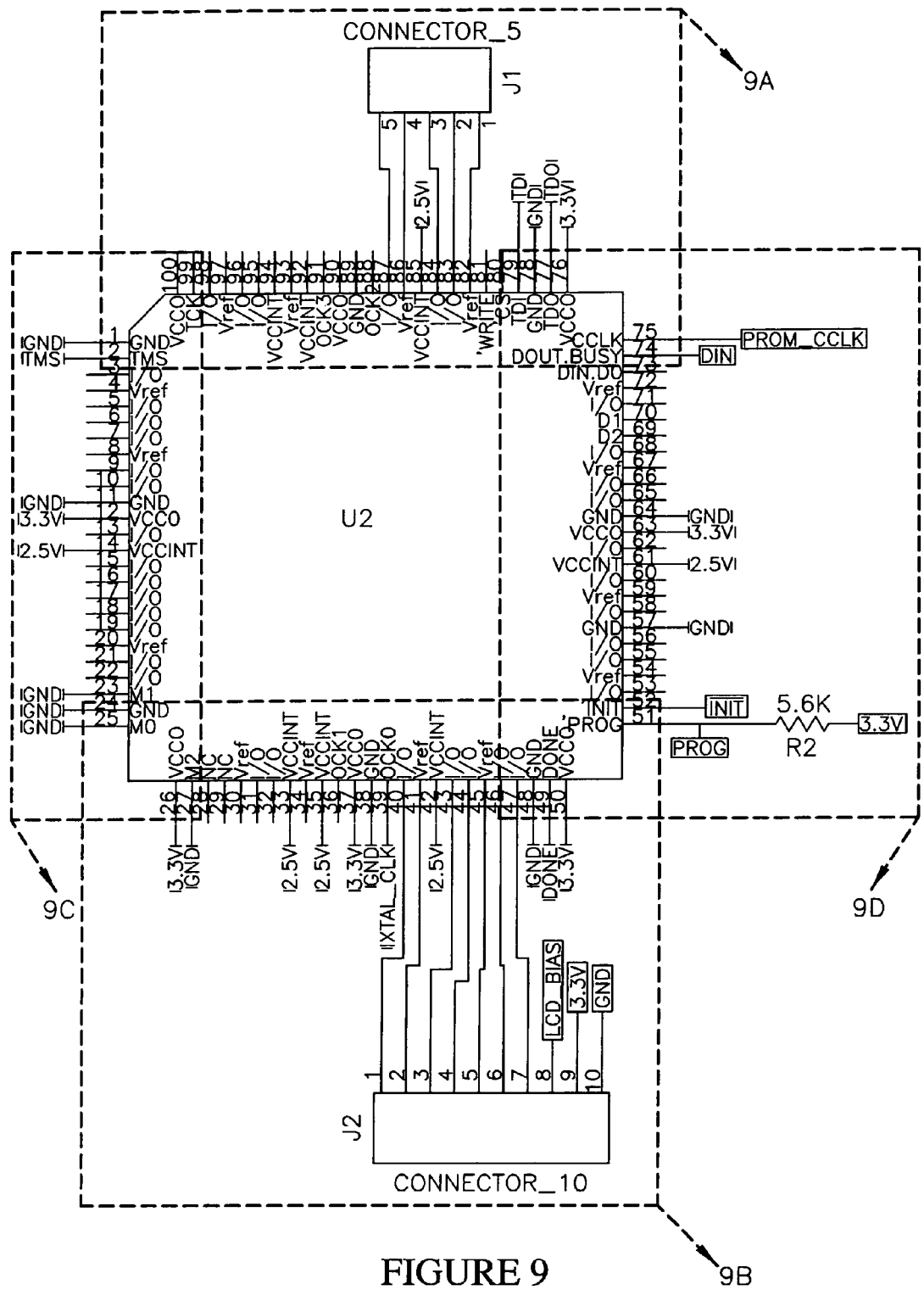
FIG. 9 is a schematic plan view of a programmable microcontroller of the control circuit.

In FIG. 9, the microcontroller U2 is illustrated separately. In the illustrative embodiment, the microcontroller U2 comprises a Xilinx Spartan II manufactured by Xilinx Corporation of San Jose, Calif. The microcontroller U2 is field programmable such that a desired interface with the phone circuitry 38 can be achieved.

Figure 9A:
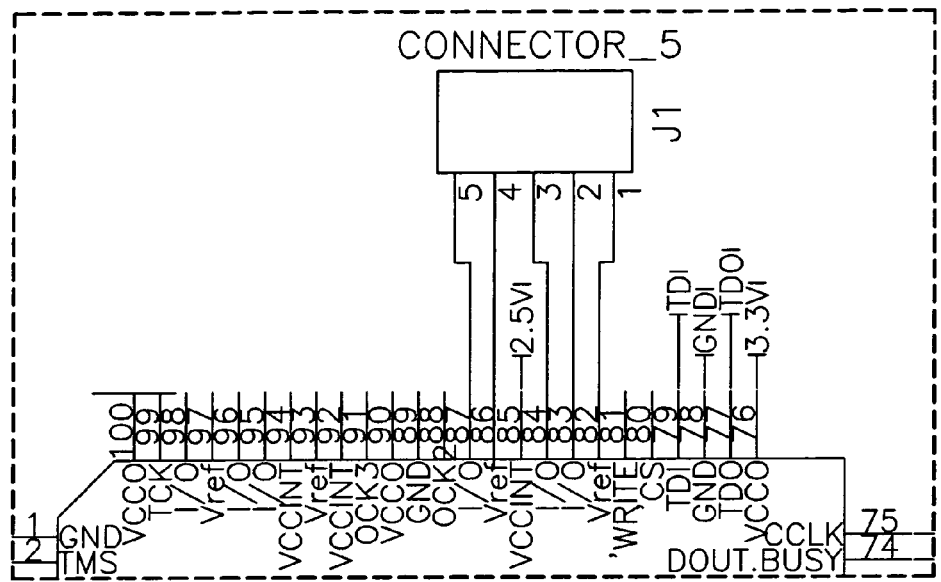
FIGS. 9A-9D are enlarged portions of the microcontroller taken along lines 9A, 9B, 9C and 9D respectively of FIG. 9.
Figure 9B:
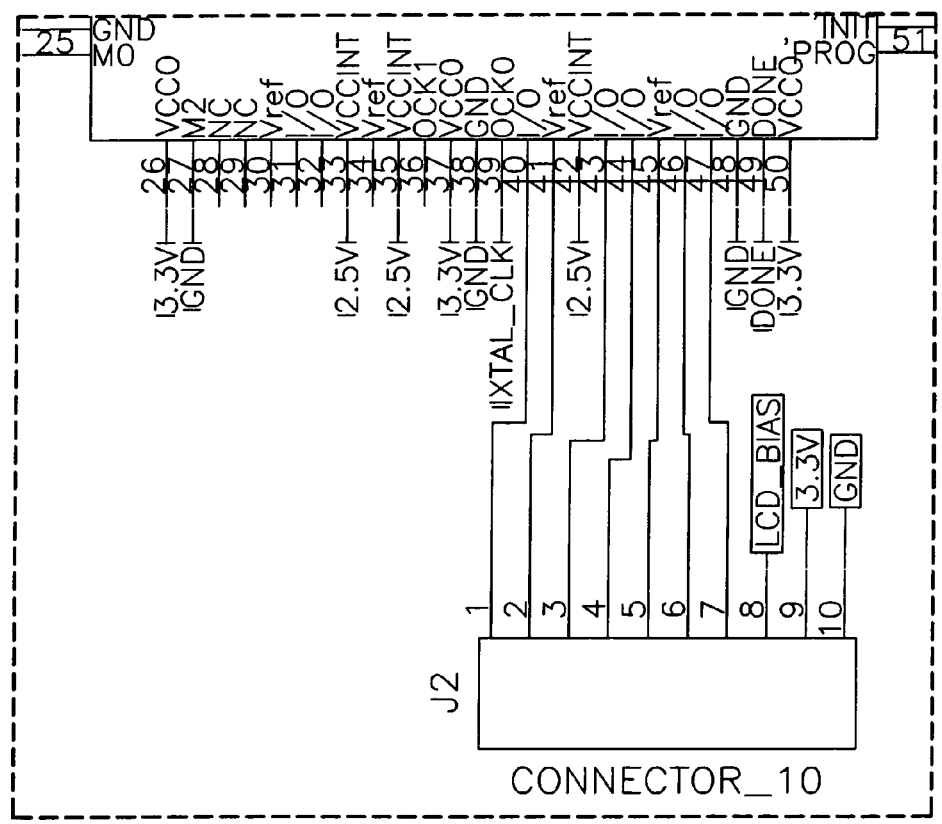
Figure 9C:
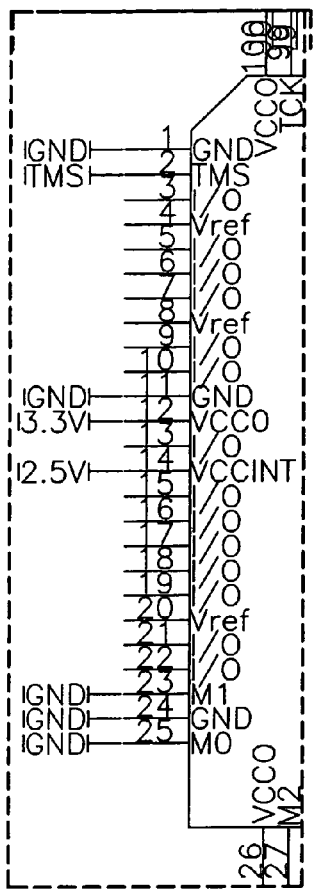
Figure 9D:
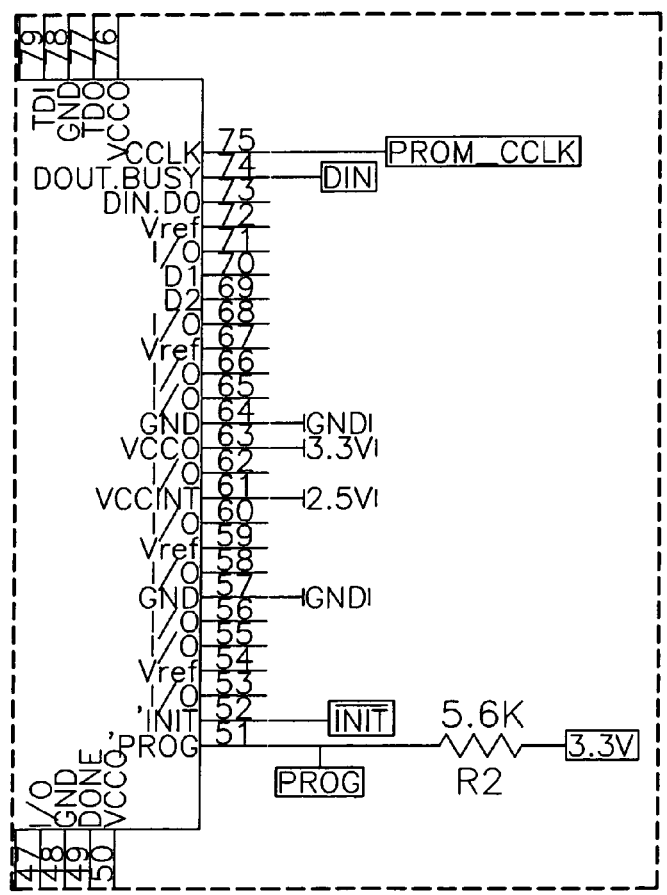

In FIGS. 9A-9C, enlarged views of the microcontroller U2 illustrating the pin out and pin in configurations are illustrated.

Figure 10:
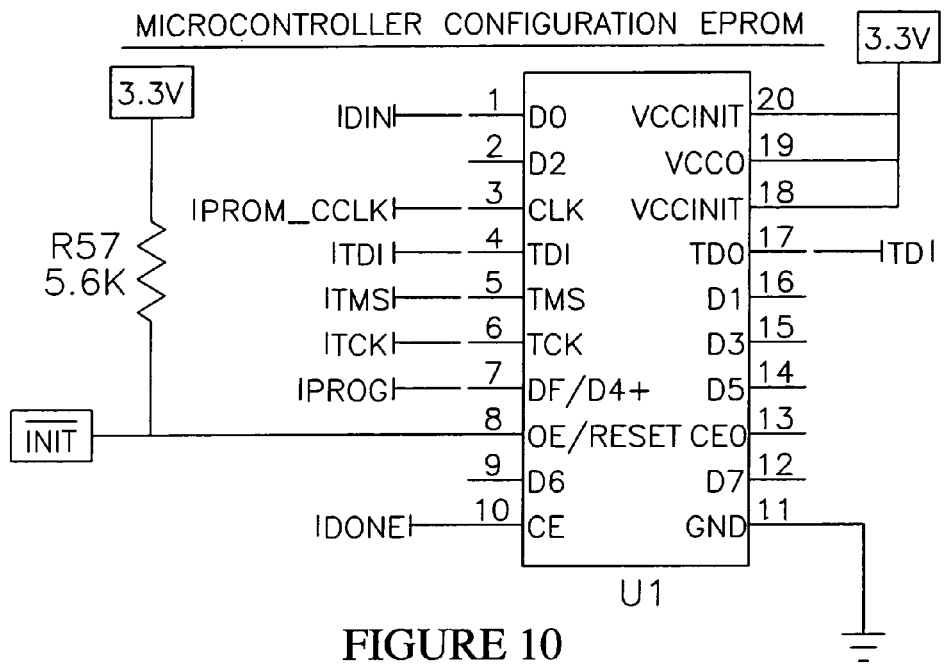
FIG. 10 is an electrical schematic of a microcontroller configuration EPROM of the control circuit.

In FIG. 10, an electrical schematic of the microcontroller EPROM U1 is illustrated separately.

Figure 11:
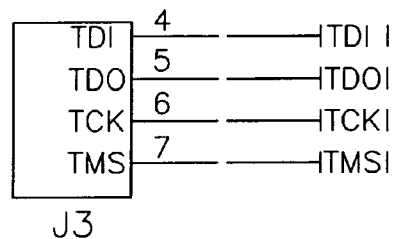
FIG. 11 is an electrical schematic of a microcontroller cable of the control circuit.

In FIG. 11, an electrical schematic of microcontroller cable J3 is illustrated separately.

Figure 12:
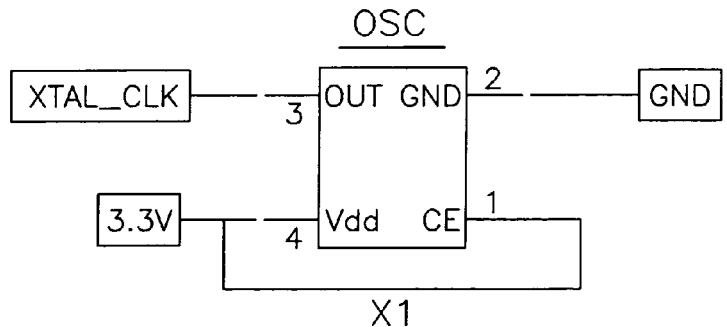
FIG. 12 is an electrical schematic of an oscillator (OSC) of the control circuit.

In FIG. 12, an electrical schematic of OSC X1 (oscillator) is illustrated separately.

Figure 13:
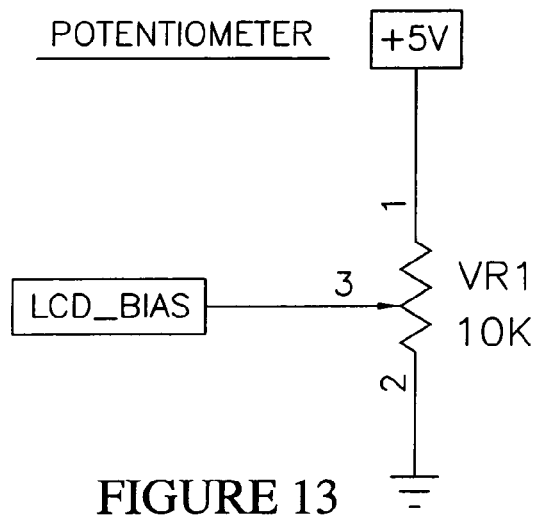
FIG. 13 is an electrical schematic of a potentiometer of the control circuit.

In FIG. 13, an electrical schematic of potentiometer VR1 is illustrated separately.

sistor Q1 comprises an N-channel MOSFET for LED control, available from Digi-Key as part number IRLL-2705CT-ND.

Thus the invention provides an improved portable phone and an improved method for displaying data in a portable phone. While the invention has been described with reference to certain preferred embodiments, as will be apparent to those skilled in the art, certain changes and modifications can be made without departing from the scope of the invention as defined by the following claims.

What is claimed is:

1. A portable phone comprising:
   a handset configured for holding proximate to an ear of a user for conducting a two way conversation; and
   a projection system on the handset configured to project a projected image from the handset onto a viewing surface physically separate from the handset, the projected image viewable by the user with the handset held proximate to the ear and without interrupting the conversation;

the handset and the projection system configured to control one or more of a location, a size and a focus of the projected image by moving of the handset about the ear by the user.

2. The phone of claim 1 wherein the projection system includes a set of optics fixedly attached to the handset and configured for movement with the handset to project the projected image at a selected distance along a vector extending from the handset to the viewing surface.

3. The phone of claim 1 wherein the projection system includes a liquid crystal display in light communication with a light source.

4. The phone of claim 1 wherein the projection system is configured to generate a pattern representative of the projected image, and at least one set of optics including a light piping optical element configured to project the projected image onto the viewing surface.

5. The phone of claim 1 further comprising an orientation device comprising a plurality of sensors on the handset configured to sense an orientation of the handset in at least four different positions, the phone capable of orienting the projected image as a function of the orientation of the handset.

6. The phone of claim 1 wherein the viewing surface comprises a body part, clothing or furniture.

7. The phone of claim 1 wherein the handset includes a speaker, a microphone, and a front surface, and the projection system is configured to project the projected image along an optical axis substantially in a direction extending from the speaker towards the microphone and generally orthogonally to the front surface.

8. The phone of claim 1 further comprising a pulsing circuit configured to pulse a brightness of the projected image.

9. The phone of claim 1 wherein the viewing surface is about 8 to 16 inches from the handset, and wherein the projection system is configured to form the projected image with a width of about 25 mm to 152 mm, and a height of about 7.6 mm to 46.2 mm.

10. A portable phone comprising:
a handset configured for holding proximate to an ear of a user; and
a projection system on the handset configured to project a projected visual image from the handset on a viewing surface physically separate from the handset viewable and readable by the user with the handset held proximate to the ear;
the projection system comprising a light source comprising a solid state diode with an integral heat sink, and a light valve in light communication with the light source, the light valve configured to project the projected image onto the viewing surface;
the handset and the projection system configured to control a location, a size and a focus of the projected image by moving of the handset about the ear by the user.

11. The phone of claim 10 wherein the light valve comprises a liquid crystal display (LCD) having an active area of at least 840 pixels.

12. The phone of claim 10 wherein the light valve comprises a chip on glass (COG) liquid crystal display (LCD) having a plurality of character blocks.

13. The phone of claim 10 wherein the light source is configured to generate at least 10 Lumens of light.

14. The phone of claim 10 wherein the light source comprises an LED chip at least partially covered by a gel in optical communication and in thermal communication with the LED chip.

15. The phone of claim 10 wherein a brightness of the light source is adjustable.

16. The phone of claim 10 further comprising a plurality of sensors on the handset configured to sense a right hand orientation or a left hand orientation of the handset on the ear, and to orient the projected image so that it reads from left to right with either the right hand orientation or the left hand orientation.

17. The phone of claim 10 wherein the light valve includes an active area and the projection system includes a second set of optics configured to manipulate a size or a shape of a beam of light rays from the light source onto the active area.

18. The phone of claim 10 wherein the set of optics comprises an optical element having a substantially rectangular or elliptical perimeter.

19. A portable phone comprising:
a handset configured for holding by a user;
a direct view visual display on the handset configured to display a first image of data;
a circuit on the handset configured to generate signals for displaying the first image of the data on the direct view visual display; and
a projection system on the handset comprising a light valve and at least one set of optics fixedly attached to the handset and configured to project a projected image of the data from the handset including alphanumeric data onto a viewing surface physically separate from the handset viewable by the user with the alphanumeric data readable from left to right;
the handset and the projection system configured to control a location, a size and a focus of the projected image by moving of the handset about the ear by the user.

20. The phone of claim 19 wherein the light valve comprises a liquid crystal display having an active area in light communication with a light emitting diode light source configured to emit light rays having a density of at least 18 lumens per square mm of surface area of the light source, and a first set of optics configured to collimate the light rays and to direct the light rays onto the active area.

21. The phone of claim 19 wherein the light source comprises a light emitting diode (LED) configured to emit at least 10 Lumens of light.

22. The phone of claim 19 wherein the active area includes a plurality of rectangular blocks of pixels with each block comprising seven rows of pixels and each row comprising five pixels.

23. The phone of claim 19 wherein the liquid crystal display includes a plurality of character blocks configured to form either numbers or letters.

24. The phone of claim 19 wherein the first image and the projected image have substantially a same size.

25. The phone of claim 19 wherein the projection system is configured to project the second the projected image along a vector and at a distance from the user controlled by moving of the handset by the user about the ear.

26. The phone of claim 19 wherein the projection system comprises an addressable patterned LED display, an electroluminescent cathode ray tube, or a field emission display.

27. The phone of claim 19 wherein the second set of optics includes a lens having an electrically tunable focus length.

28. The phone of claim 19 wherein the projection system is configured to project the projected image generally orthogonally to a surface of the handset containing the direct view display and along a vector having a direction extending from a speaker towards a microphone of the handset.

29. The phone of claim 19 wherein the projection system includes a control circuit comprising a micro processor.

30. The phone of claim 19 wherein the projected image has a width greater than it's height.

31. The phone of claim 19 wherein the projected image has a length to height ratio of greater than 1:1.

32. The phone of claim 19 wherein the projected image has a width to height ratio of greater than 1.5:1.

33. The phone of claim 19 wherein the viewing surface is located on a body part of the user or on a piece of furniture in close proximity to the user.

34. The phone of claim 19 wherein the data comprises caller waiting ID data.

35. A portable phone comprising:
a handset having a front surface, a back surface, a speaker and a microphone;
a circuit on the handset configured to generate signals representative of data; and
a projection system fixedly attached to the handset configured to form a projected image responsive to the signals, and to project the projected image from the handset along a vector extending from the handset onto a viewing surface physically separate from the handset with the projected image rotated approximately 90 degrees relative to the front surface and oriented in a direction extending from the back surface towards the front surface.

36. The phone of claim 35 further comprising an orientation sensor on the handset configured to sense an orientation of the handset and to orient the projected image as a function thereof.

37. The phone of claim 35 wherein the projection system comprises a monochromatic light source, and at least one set of optics.

38. The phone of claim 35 wherein the projection system includes an element selected from the group consisting of addressable patterned LED displays, electroluminescent displays, cathode ray tubes, and field emission displays.

39. The phone of claim 35 wherein the projected image has a width to height ratio of greater than 1.5:1.

40. The phone of claim 35 wherein the handset comprises a cordless phone or a cellular phone.

41. The phone of claim 35 wherein the handset includes an opening on a bottom end surface thereof and the projection system is recessed relative to the opening.

42. The phone of claim 35 wherein the circuit comprises a microcontroller.

43. The phone of claim 35 wherein the projection system includes a light source and the circuit includes a pulsing circuit configured to pulse a current to the light source.

44. The phone of claim 35 wherein the projection system includes a light source and the circuit is configured to adjust a brightness of the light source.

45. The phone of claim 35 wherein the data comprises caller waiting ID data.

46. The phone of claim 35 wherein the projected image comprises alphanumeric characters.

47. The phone of claim 35 wherein the projected image comprises pictures, characters, drawings, symbols, photographs, or video information.

48. The phone of claim 35 wherein the projected image comprises a variable image.

49. The phone of claim 35 wherein the projected image comprises a fixed image.

50. A portable phone comprising:
a handset having a speaker and a microphone;
a projection system affixed to a portion of the handset in a rigid orientation to the portion configured to project a projected image from the handset along a vector having substantially a direction from the speaker to the microphone onto a viewing surface at a selected distance from the handset physically separate from the handset with the projected image located along a direct line of sight of a user and readable from left to right;
the handset and the projection system configured to control a location, a size and a focus of the projected image by moving of the handset by the user.

51. The phone of claim 50 wherein the projected image comprises alphanumeric data and the projection system is configured to project the alphanumeric data substantially orthogonally to a front surface of the handset.

52. The phone of claim 50 wherein the projected image comprises alphanumeric data and the projection system is configured to enable a user to view the alphanumeric data with a left to right orientation, with the handset in a left handed mode and with the handset in a right handed mode.

53. The phone of claim 50 wherein the projection system comprises a light source comprising an LED chip coated with a soft gel.

54. The phone of claim 50 wherein the projection system comprises a light source and a refractive optical element separate from the light source configured to reduce an angular emission of light from the light source.

55. The phone of claim 50 wherein the projection system is configured to project the projected image with a width of between 38 mm and 100 mm at a distance between 200 mm and 400 mm.

56. A portable phone comprising:
a handset configured for holding proximate to an ear of a user;
a control circuit on the handset comprising a micro controller configured to process signals representative of data;
a liquid crystal display on the handset in signal communication with the control circuit having a plurality of character blocks configured to form a pattern responsive to the signals; and
a set of optics on the handset in light communication with the liquid crystal display configured to process the pattern and to project a projected image from the handset onto a viewing surface physically separate from the handset with a location, a focus and a size controlled by movement of the handset about the ear.

57. The phone of claim 56 wherein the projection system includes a light source configured to generate at least 10 Lumens of light, and at least one optics element configured to collimate and direct the light onto the character blocks.

58. The phone of claim 56 wherein each character block is configured to form both letters and numbers.

59. The phone of claim 56 wherein the character blocks form an active area on the liquid crystal display of at least 840 pixels.

60. The phone of claim 56 wherein a light source provides light to the liquid crystal display and comprises a substrate configured as a heat sink, a LED on the substrate chip covered by a soft gel, and a lens in physical contact with the gel.

61. The phone of claim 56 wherein the liquid crystal display comprises a chip on glass display.

62. The phone of claim 56 further comprising a light source in light communication with the liquid crystal display, and wherein the control circuit includes a pulsing circuit configured to pulse the light source.

63. The phone of claim 56 wherein the viewing surface is about 8 to 16 inches from the handset and comprises a body part of the user.

64. A method for displaying data in a portable phone comprising:
providing a handset configured for holding proximate to an ear of a user for conducting a two way conversation;
providing a projection system on the handset configured to project a projected image of the data on a viewing surface physically separate from the handset viewable by the user with a direct line of sight with the handset held proximate to the ear and without interrupting the conversation; and
projecting the projected image on the viewing surface during the two way conversation using the projection system.

65. The method of claim 64 wherein the projection system comprises a light valve configured to generate a pattern representative of the projected image, and at least one set of optics configured to process the pattern to project the projected image onto the viewing surface.

66. The method of claim 64 wherein the handset includes a front surface, a microphone and a speaker, and the projected image is projected during the projecting step generally orthogonally to the front surface and in a direction extending from the speaker towards the microphone.

67. The method of claim 64 wherein the handset includes an opening and the projecting step projects the visual image through the opening.

68. The method of claim 64 farther comprising:
providing a sensor on the handset configured to sense an orientation of the handset and to orient the projected image as a function of the orientation; and
orienting the projected image during the projecting step using the sensor.

69. The method of claim 64 wherein the viewing surface comprises a body part, clothing or furniture.

70. A method for displaying data in a portable phone comprising:
providing the phone with a data projection system configured to project a projected image representative of the data onto a viewing surface physically separate from the handset;
holding the phone proximate to an ear of a the user;
conducting a two way conversation during the holding step; and
projecting the projected image along a vector extending from the handset to the viewing surface controlled by movement of the phone about the ear onto the viewing surface while performing the holding and conducting steps with the projected image rotated approximately 90 degrees relative to a front surface of the phone and oriented in a direction extending from a back surface towards the front surface of the phone.

71. The method of claim 70 further comprising:
sensing at least four different positions of the phone during the holding step; and
projecting the projected image from the phone with a second orientation dependent on the sensing step.

72. The method of claim 70 wherein the viewing surface comprises a body part of the user, and further comprising moving the body part or the phone during the projecting step to focus and locate the projected image on the body part.

73. The method of claim 70 wherein the viewing surface is about 8 to 16 inches from the phone, and the projected image has a width of about 25 mm to 152 mm, and a height of about 7.6 mm to 46.2 mm.

74. The method of claim 70 wherein the projected image is oriented along curved lines.

75. The method of claim 70 further comprising pulsing a brightness of the projected image during the projecting step.

76. The method of claim 70 wherein the phone includes a speaker and a microphone and the vector has a direction extending from the speaker towards the microphone and a distance controlled by movement of the phone about the ear.

77. The method of claim 70 wherein the data projection system comprises a diode light source, a light valve and at least one optics system.

78. The method of claim 70 wherein the data projection system includes at least one optical element configured to project the projected image.

79. A method for displaying data in a portable phone comprising:
providing the phone with a handset having a surface, a speaker and a microphone;
providing a projection system on the handset configured to project a projected image the including alphanumeric data from the handset;
holding the handset proximate to an ear of a user of the phone;
projecting the projected image from the handset generally orthogonally to the surface and along a vector extending from the speaker towards the microphone onto a viewing surface physically separate from the handset and viewable during the holding step with the alphanumeric data readable from left to right; and
moving the handset about the ear during the projecting step to point the vector at the viewing surface.

80. The method of claim 79 further comprising sensing an orientation of the handset during the holding step and orienting the projected image responsive to the sensing step.

81. The method of claim 79 the moving step comprises rotating the handset about the ear.

82. The method of claim 79 wherein the projection system includes a light source that is pulsed during the projecting step.

83. The method of claim 79 wherein the projection system includes a light source having an adjustable brightness.

84. The method of claim 79 wherein the data comprises caller waiting ID data.

85. The method of claim 79 wherein the projected image comprises alphanumeric characters.

86. The method of claim 79 wherein the projected image comprises pictures, characters, drawings, symbols, photographs, or video information.

87. The method of claim 79 wherein the projected image comprises a variable image or a fixed image.

88. A method for displaying data in a portable phone comprising:
providing a handset comprising a visual display, a circuit configured to generate signals for displaying a first image of the data on the visual display, a projection system in the handset configured to form a projected image of the data responsive to the signals;
using the signals to operate the projection system to generate the projected image; and
projecting the projected image from the handset using the projection system onto a viewing surface physically separate from the handset viewable by a user during a conversation using the phone with the projected image located in a direct line of sight of the user and oriented for reading from left to right.

89. The method of claim 88 wherein the handset includes a bottom end surface with an opening and the projected image is projected from the opening during the projecting step.

90. The method of claim 88 wherein the projection system includes a light source, and a light valve configured to use light from the light source to generate a pattern representative of the projected image responsive to the signals.

91. The method of claim 88 wherein the projection system includes an emissive light valve configured to generate a pattern representative of the projected image responsive to the signals.

92. The method of claim 88 wherein the projection system includes a reflective display.

93. The method of claim 88 wherein the projecting the projected image step comprises projecting a mirror image from an end surface of the handset comprising alphanumeric characters which are substantially orthogonal to a keypad surface of the handset.

94. The method of claim 88 wherein the viewing surface is about 8 to 16 inches from the handset, and the projected image has a width of about 25 mm to 152 mm, and a height of about 7.6 mm to 46.2 mm.

95. The method of claim 88 wherein the projected image comprises caller waiting ID data.

96. The method of claim 88 wherein the projected image comprises alphanumeric characters.

97. The method of claim 88 wherein the projected image comprises pictures, characters, drawings, symbols, photographs, or video information.

98. The method of claim 88 wherein the projected image comprises a fixed image.

99. A method for displaying data in a portable phone comprising:
providing the phone with a handset having an image projection system;
holding the handset to an ear of a user;
conducting a two way conversation using the handset with the handset held to the ear;
transmitting the data to the image projection system during the two way conversation;
during the conducting step, projecting a projected image representative of the data from the handset using the image projection system onto a viewing surface physically separate from the handset and viewable by the user in a direct line of sight with the handset held to the ear; and
controlling an orientation, a location, a size and a focus of the projected image during the conducting step by moving the handset about the ear.

100. The method of claim 99 further comprising providing the handset with a sensing system, sensing an orientation of the handset using the sensing system, and then projecting the projected image onto the viewing surface with an orientation dependent on the sensed orientation of the handset.

101. The method of claim 99 further comprising delaying the projection step for a set time period following the transmitting step.

102. The method of claim 99 wherein the viewing surface comprises a body part of the user.

103. The method of claim 99 wherein the viewing surface comprises furniture.

104. The method of claim 99 wherein the viewing surface comprises clothing.

105. The method of claim 99 wherein the handset includes a front surface and a back surface and the projecting step projects the projected image as a row of alpha numeric characters reading in a direction extending from the front surface towards the back surface.

106. The method of claim 99 wherein the handset includes a speaker and a microphone and the projecting step projects the projected image in a direction extending from the speaker towards the microphone.

107. An image projection system for a portable phone having a phone circuitry and a handset comprising:
an electro optic system configured for mounting on the handset, the electro optic system configured to generate a pattern corresponding to data generated by the phone circuitry; and
an optics system configured for mounting on the handset in signal communication with the electro optic system, the optics system configured to process the pattern and to project a projected image from a bottom end surface of the handset and to locate, size focus and orient the projected image for viewing with a direct line of sight to a user on a viewing surface physically separate from the handset by moving of the handset about an ear of the user during a phone conversation.

108. The image projection system of claim 107 wherein the electro optic system comprises a light source in light communication with a first set of optics and a light valve.

109. The image projection system of claim 108 wherein the light valve comprises a liquid crystal display (LCD).

110. The image projection system of claim 107 wherein the electro optic system comprises an emissive display.

111. The image projection system of claim 107 wherein the optics system includes a second set of optics configured to process the pattern into a into a mirror image of the projected image and to project the mirror image onto the viewing surface.

112. The image projection system of claim 111 wherein the second set of optics includes at least one positive lens.

113. The image projection system of claim 107 wherein the data comprises caller waiting ID data.

114. The image projection system of claim 107 wherein the projected image comprises alphanumeric characters.

115. The image projection system of claim 107 wherein the projected image comprises pictures, characters, drawings, symbols, photographs, or video information.

116. The image projection system of claim 107 wherein the handset includes an internal compartment and the electro optic system and the optics system are configured for mounting in the internal compartment.

117. The image projection system of claim 107 wherein the viewing surface is about 8 to 16 inches from the bottom end surface.

118. The image projection system of claim 107 wherein the viewing surface comprises a body part of a user of the portable phone.

119. The image projection system of claim 107 wherein the phone includes a scroll function and the projected image can be changed responsive to operation of the scroll function.

120. A method for modifying a portable phone having a handset and a phone circuitry comprising:
providing a projection system configured to project a projected image from a bottom end surface of the handset and to locate the projected image on a viewing surface physically separate from the handset;
the handset and the projection system configured to control a location, a size and a focus of the projected image for viewing by a user by moving of the handset about the ear of the user during a phone conversation with the phone held to the hear; and placing the image projection system in the handset.

121. The method of claim 120 wherein the handset includes an internal compartment and the placing step installs the image projection system in the internal compartment.

122. The method of claim 120 wherein the projection system includes a set of optics fixedly attached to the handset and configured for movement with the handset to locate the projected image on the viewing surface.

123. The method of claim 120 wherein the projection system includes a light valve.

124. The method of claim 120 wherein the light valve includes a liquid crystal display and the projection system includes a light emitting diode.

125. The method of claim 120 wherein the viewing surface comprises a body part of the user, and further comprising moving the body part or the phone following the placing step to focus and locate the projected image on the body part.

126. The method of claim 120 wherein the projection system is configured to project the projected image onto the viewing surface located from 8 to 16 inches from the bottom end surface.

127. An image projection system configured for attachment to a portable phone having a handset comprising:

a projection system attachable to the handset comprising a diode light source in thermal communication with a heat sink, a light valve in light communication with the light source configured to generate a pattern representative of data, and a set of optics configured to process the pattern and to project a projected image from a bottom end surface of the handset onto a viewing surface physically separate from the phone with a direct line of sight to a user;

the projection system comprising a sensing device configured to orient the projected image for viewing by the user;

the handset and the projection system configured to control a location, a size and a focus of the projected image by moving of the handset about the ear by the user during the phone conversation.

128. The image projection system of claim 127 wherein the light valve comprises a liquid crystal display (LCD) having an active area of at least 840 pixels.

129. The image projection system of claim 127 wherein the light valve comprises a chip on glass (COG) liquid crystal display (LCD) having a plurality of character blocks.

130. The image projection system of claim 127 wherein the light source is configured to generate at least 10 Lumens of light.

131. The image projection system of claim 127 wherein the light source comprises an LED chip.

132. The image projection system wherein the projected image can be focused on the viewing surface by moving of the handset or the viewing surface.

133. The image projection system of claim 127 wherein the viewing surface is 6 to 12 inches from the bottom end surface.

134. The image projection system of claim 127 wherein the phone includes a scroll function and the projected image can be changed responsive to operation of the scroll function.

\* \* \* \* \*

UNITED STATES PATENT AND TRADEMARK OFFICE
CERTIFICATE OF CORRECTION

PATENT NO. : 7,539,513 B2
APPLICATION NO. : 11/049458
DATED : May 26, 2009
INVENTOR(S) : David A. Cathey, Jr., Steven Howell and James Cathey It is certified that error appears in the above-identified patent and that said Letters Patent is hereby corrected as shown below:

On the title page:

(75) Inventors: David A. Cathey, Jr. delete "Boise" and insert --Eagle--, ID (US)
Steven Howell, Boise, ID (US)
James Cathey, Eagle, ID (US)

In column 8, line 4:
delete "in" and insert --In--

In column 12, line 28:
delete "it's" and insert --its--

In column 28, line 23 after system: insert --of claim 127--

Signed and Sealed this

Twenty-ninth Day of December, 2009

David J. Kappos
*Director of the United States Patent and Trademark Office*